(12) United States Patent
Lloyd

(10) Patent No.: US 10,870,458 B2
(45) Date of Patent: Dec. 22, 2020

(54) ADJUSTABLY SIZED BICYCLE FRAME

(71) Applicant: Jennock Limited, Birmingham (GB)

(72) Inventor: Andrew Webster Lloyd, Abergavenny (GB)

(73) Assignee: Jennock Limited, Birmingham (GB)

( * ) Notice: Subject to any disclaimer, the term of this patent is extended or adjusted under 35 U.S.C. 154(b) by 58 days.

(21) Appl. No.: 15/741,716

(22) PCT Filed: Jun. 30, 2016

(86) PCT No.: PCT/GB2016/051987
§ 371 (c)(1),
(2) Date: Jan. 3, 2018

(87) PCT Pub. No.: WO2017/006090
PCT Pub. Date: Jan. 12, 2017

(65) Prior Publication Data
US 2019/0077476 A1 Mar. 14, 2019

(30) Foreign Application Priority Data

Jul. 3, 2015 (GB) .................................... 1511741.9

(51) Int. Cl.
*B62J 1/08* (2006.01)
*B62K 19/18* (2006.01)
(Continued)

(52) U.S. Cl.
CPC ................. *B62J 1/08* (2013.01); *B62J 25/00* (2013.01); *B62K 19/18* (2013.01); *B62K 13/00* (2013.01)

(58) Field of Classification Search
CPC .. B62J 1/08; B62J 25/00; B62K 19/18; B62K 13/00
(Continued)

(56) References Cited

U.S. PATENT DOCUMENTS 2,419,703 A 4/1947 Bartlett
2,993,709 A 7/1961 Wick
(Continued)

FOREIGN PATENT DOCUMENTS

CN 2759916 2/2006
CN 200630178097 12/2006
(Continued)

OTHER PUBLICATIONS

International Search Report for Application PCT/GB2016/051987 dated Jan. 19, 2017.
(Continued)

*Primary Examiner* — Tony H Winner
*Assistant Examiner* — Felicia L. Brittman
(74) *Attorney, Agent, or Firm* — Honigman LLP

(57) ABSTRACT

A bicycle frame including a front portion configured to receive a front wheel assembly; a rear portion configured to receive a rear wheel assembly; and a connecting member connected to the front portion at a first connecting point and connected to the rear portion at a second connecting point, the first and second connecting points being spaced from one another along the length of the connecting member; wherein one of the front and rear portions extends towards and is connected to the other of the front and rear portions at a third connecting point to form a link; wherein the frame is configured so as to allow a distance between at least two of the connecting points to be adjusted; wherein adjustment of said distance increases or decreases the size of the frame.

32 Claims, 21 Drawing Sheets

(51) Int. Cl.
*B62J 25/00* (2020.01)
*B62K 13/00* (2006.01)

(58) Field of Classification Search
USPC .......................................................... 280/287
See application file for complete search history.

(56) References Cited

U.S. PATENT DOCUMENTS

| | | | |
|---|---|---|---|
| 4,460,192 A * | 7/1984 | Takamiya | B62K 15/008 |
| | | | 280/278 |
| 4,909,537 A * | 3/1990 | Tratner | B62K 13/00 |
| | | | 280/278 |
| 5,590,895 A | 1/1997 | Hiramoto | |
| 5,722,718 A | 3/1998 | Still et al. | |
| D420,942 S | 2/2000 | Chen | |
| 6,428,437 B1 | 8/2002 | Schlanger | |
| D512,664 S | 12/2005 | Schreier | |
| D644,571 S | 9/2011 | Bethlenfalvy | |
| D654,962 S | 2/2012 | Scolari et al. | |
| D712,980 S | 9/2014 | Lovley, II et al. | |
| 8,864,159 B2 * | 10/2014 | Scolari | B62K 3/02 |
| | | | 280/220 |
| D721,990 S | 2/2015 | Lugo | |
| D735,619 S | 8/2015 | Lawson et al. | |
| 2003/0080594 A1 | 5/2003 | Geyer et al. | |
| 2003/0234509 A1 | 12/2003 | Chen et al. | |
| 2009/0212529 A1 | 8/2009 | Stenberg | |
| 2015/0148173 A1 | 5/2015 | Kim et al. | |

FOREIGN PATENT DOCUMENTS

| | | |
|---|---|---|
| CN | 101277867 A | 10/2008 |
| CN | 202703798 U | 1/2013 |
| CN | 203410567 U | 1/2014 |
| CN | 104260809 A | 1/2015 |
| CN | 201530030948 | 2/2015 |
| CN | 204264382 U * | 4/2015 |
| CN | 204309983 U | 5/2015 |
| CN | 201630233944 | 6/2016 |
| DE | 4232592 A1 | 3/1994 |
| DE | 20100309 U1 | 5/2002 |
| DE | 10135622 A1 | 2/2003 |
| EP | 163988 A2 | 12/1985 |
| EP | 501385 A1 | 9/1992 |
| EP | 1410984 A1 | 4/2004 |
| FR | 684306 A | 6/1930 |
| GB | 415085 A | 8/1934 |
| GB | 548869 A | 10/1942 |
| GB | 2511522A A | 9/2014 |
| JP | 2007-99063 A | 4/2007 |
| JP | 200799063 A | 4/2007 |
| WO | WO-2009056540 A1 | 5/2009 |
| WO | 2013150411 A1 | 10/2013 |
| WO | WO-2016082399 | 6/2016 |

OTHER PUBLICATIONS

Search Report for Application GB1511741.9 dated Dec. 18, 2015.
Examination Report for Application GB1511741.9 dated Aug. 11, 2016.
Japanese Office Action for Application No. 2017-568371 dated Feb. 26, 2019 along with English translation.
Chinese Office Action for Application 201680051196.4 dated Nov. 16, 2019.
Notice of Allowance from Taiwan Patent Office for Application No. 107303827 dated Jul. 17, 2019.

* cited by examiner

ADJUSTABLY SIZED BICYCLE FRAME

TECHNICAL FIELD

The invention relates to an adjustably sized bicycle frame and particularly, but not exclusively, to a bicycle frame for children which can increase in size as the child grows.

BACKGROUND

Conventional bicycles typically only allow for minor adjustments of the bicycle's geometry. For example, the height and position (in a fore and aft direction) of the bicycle's seat may be adjusted to suit the user. It may also be possible to alter the reach by changing the length of the bicycle's stem.

As a result of the limited adjustment of conventional bicycles, it is essential that the frame of the bicycle is sized appropriately for the user. This is problematic for children's bicycles where the child can outgrow the frame after only a short time. Consequently, there is a tendency for children to ride bicycles which are either too large (purchased with the expectation that the child will grow into it) or too small (having already outgrown the bicycle) for them. Both scenarios can be uncomfortable and also dangerous for the child.

Efforts have been made to overcome this issue by devising bicycle frames which have more adjustability. For example, DE10135622 describes a bicycle frame which has a telescopic structure that allows the frame to increase in size as the child grows. However, this arrangement only allows the frame to be lengthened so as to increase wheelbase (the distance from the center of the front wheel to the center of the rear wheel). Consequently, the geometry of the frame is not ideal in all configurations.

It is therefore desirable to provide an adjustable bicycle frame which overcomes the shortcomings of prior art frames.

SUMMARY

In accordance with an aspect of the invention, there is provided a bicycle frame comprising: a front portion configured to receive a front wheel assembly; a rear portion configured to receive a rear wheel assembly; and a connecting member connected to the front portion at a first connecting point and connected to the rear portion at a second connecting point, the first and second connecting points being spaced from one another along the length of the connecting member; wherein one of the front and rear portions extends towards and is connected to the other of the front and rear portions at a third connecting point to form a link; wherein the frame is configured so as to allow a distance between at least two of the connecting points to be adjusted; wherein adjustment of said distance increases or decreases the size of the frame.

The frame may be configured so as to allow a distance between the first and third connecting points and/or a distance between the second and third connecting points to be adjusted.

Adjustment of said distance may increase or decrease the reach and/or wheelbase of the frame.

Adjustment of said distance may increase or decrease both the reach and wheelbase simultaneously.

Adjustment of said distance may increase both a vertical and a horizontal dimension of the frame or decrease both a vertical and a horizontal dimension of the frame.

Adjustment of said distance may increase or decrease both the vertical and horizontal dimensions simultaneously.

The vertical dimension may include at least one of stack, axle-stack, head tube height, top tube height, standover height and minimum saddle height and/or the horizontal dimension may include at least one of wheelbase, reach and axle-reach.

The link may have a plurality of mounting positions which define said distance (and the third connecting point).

The plurality of mounting positions may be formed by a plurality of discrete holes or a continuous slot. The plurality of holes or continuous slot may be provided on the front portion.

Adjustment of said distance may change an orientation of the connecting member, the orientation of the connecting member determining the relative positions of the front and rear portions.

Adjustment of said distance may change the orientation of the connecting member relative to one or both of the front and rear portions.

The first connecting point may be formed as a first pivot and/or the second connecting point may be formed as a second pivot. The first and second pivots may allow the orientation of the connecting member to be adjusted.

The front portion may comprise a tensioning slot in which the first pivot is slidably mounted and/or the rear portion may comprise a tensioning slot in which the second pivot is slidably mounted, the tensioning slot allowing the orientation of the connecting member to be adjusted so as to tension a belt or chain.

The tensioning slot may be provided with a lead screw arrangement which moves the pivot along the slot.

The connecting member or rear portion may further comprise a bottom bracket shell. The bottom bracket shell may be disposed below the second connecting point. Locating the bottom bracket shell below the second connecting point increases movement of the bottom bracket shell.

The first connecting point, the second connecting point and/or the bottom bracket shell may be offset from a longitudinal axis of the connecting member such that rotation of the connecting member about the longitudinal axis changes the position of the first connecting point, the second connecting point and/or the bottom bracket shell. The connecting member can therefore be rotated so that the connecting member is moved rearward and the bottom bracket shell is moved forward.

The connecting member may be configured to receive a seat assembly.

In accordance with another aspect of the invention, there is provided a bicycle comprising a bicycle frame as described above.

The bicycle may further comprise a seat assembly received by the connecting member, the seat assembly comprising a seat post and a saddle, the seat post and saddle having a complementary curved rail portion and clamp portion, the saddle being slidable relative to the seat post along the curved rail portion; wherein the curved rail portion is configured such that the angle of the saddle relative to the post changes as it is slid relative to the seat post.

The angle of the saddle (the angle between the top surface of the saddle and the seat post when measured from the front of the saddle downwards to the seat post) may increase as it is slid backwards.

The bicycle may comprise a front fork having a plurality of fork-ends located at different positions for receiving wheels of different size.

The bicycle may comprise a sprocket assembly, the sprocket assembly having an inner sprocket and an outer annular sprocket which engages with the inner sprocket, wherein the outer annular sprocket is removable from the inner sprocket to alter a gear ratio.

In accordance with another aspect of the invention there is provided a kit of parts comprising: a front portion configured to receive a front wheel assembly; a rear portion configured to receive a rear wheel assembly; and a connecting member; the front portion, the rear portion and the connecting member being configured to be assembled to form the bicycle frame described previously.

In accordance with another aspect of the invention there is provided a method of adjusting the size of the bicycle frame or bicycle described previously, the method comprising: adjusting the distance between at least two of the connecting points so as to increase or decrease the size of the frame.

In accordance with another aspect of the invention there is provided a bicycle comprising: a rear sprocket connected to a driven rear wheel; a crankset having a front sprocket and connected to the rear sprocket by a chain or toothed belt; wherein the front and/or rear sprocket comprises a sprocket assembly, the sprocket assembly comprising an inner sprocket and an outer annular sprocket detachably connectable to the inner sprocket, the sprocket assembly having a first configuration where the outer annular sprocket is detached from the inner sprocket and a second configuration where the outer annular sprocket is connected to the inner sprocket; wherein the inner sprocket has a plurality of teeth which engage with the chain or toothed belt when in the first configuration; and wherein the outer annular sprocket has a radially outer surface having a plurality of teeth which engage with the chain or toothed belt when in the second configuration and a radially inner surface having a plurality of teeth which engage with the teeth of the inner sprocket when in the second configuration; wherein the number of teeth on the radially outer surface of the outer annular sprocket is greater than the number of teeth on the inner sprocket and the sprocket assembly is convertible between the first and second configurations to alter a gear ratio of the bicycle.

The outer annular sprocket may be formed by a plurality of segments which are detachably connected to one another.

The plurality of segments may be detachably connected to one another by interlocking joints.

The outer annular sprocket may comprise two semi-circular halves.

The number of teeth on the radially inner surface of the outer annular sprocket may be equal to the number of teeth on the inner sprocket.

The outer annular sprocket may be a first outer annular sprocket and the sprocket assembly may further comprise a second annular sprocket, the number of teeth on the second outer annular sprocket being greater than the number of teeth on the first outer annular sprocket; wherein the second outer annular sprocket is detachably connectable to the inner sprocket or the first outer annular sprocket, the sprocket assembly having a third configuration where the second outer annular sprocket is connected to the inner sprocket or the first outer annular sprocket.

BRIEF DESCRIPTION OF THE DRAWINGS

For a better understanding of the invention, and to show more clearly how it may be carried into effect, reference will now be made, by way of example, to the accompanying drawings, in which:—

DETAILED DESCRIPTION

Figure 1:
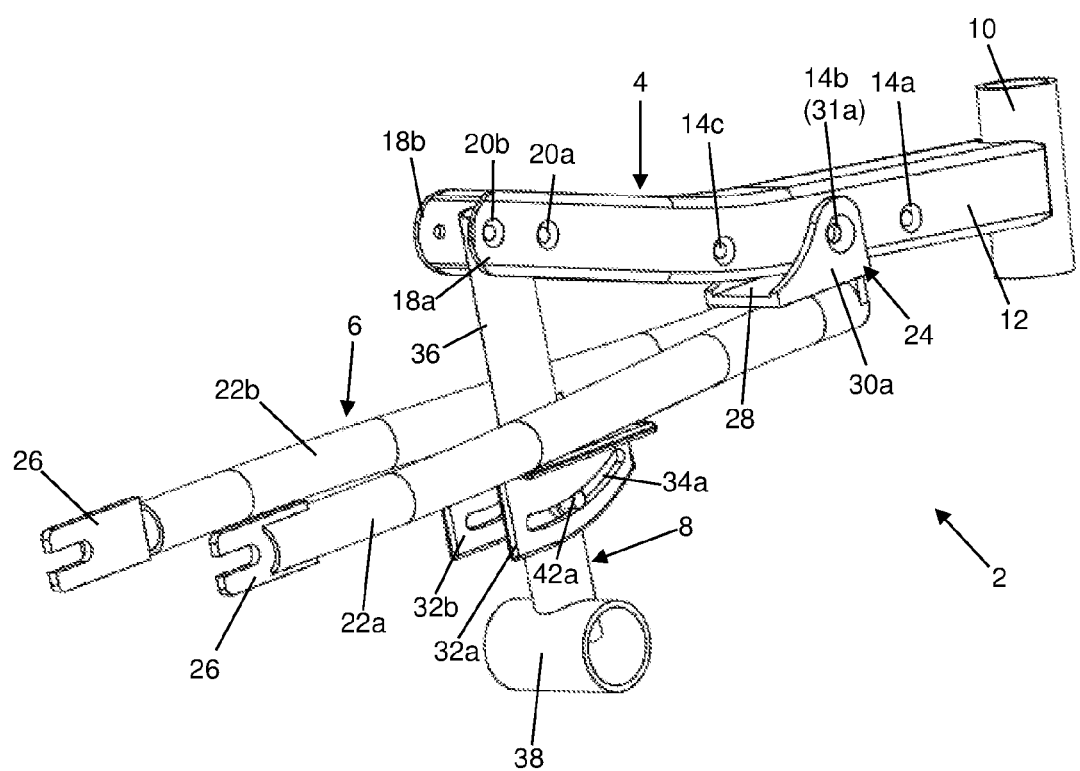
FIG. 1 is a rear perspective view of a bicycle frame according to an embodiment of the invention.
Figure 2:
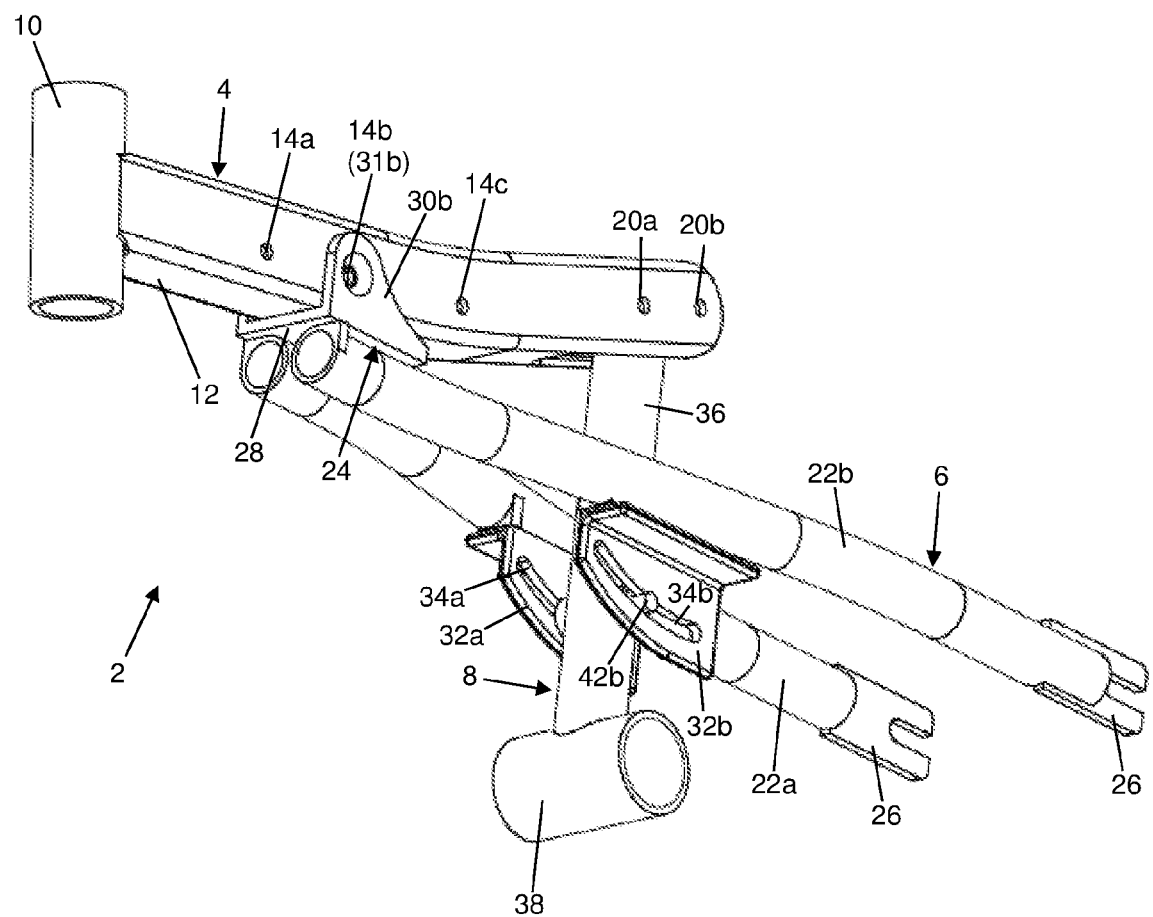
FIG. 2 is a front perspective view of the bicycle frame.
Figure 3:
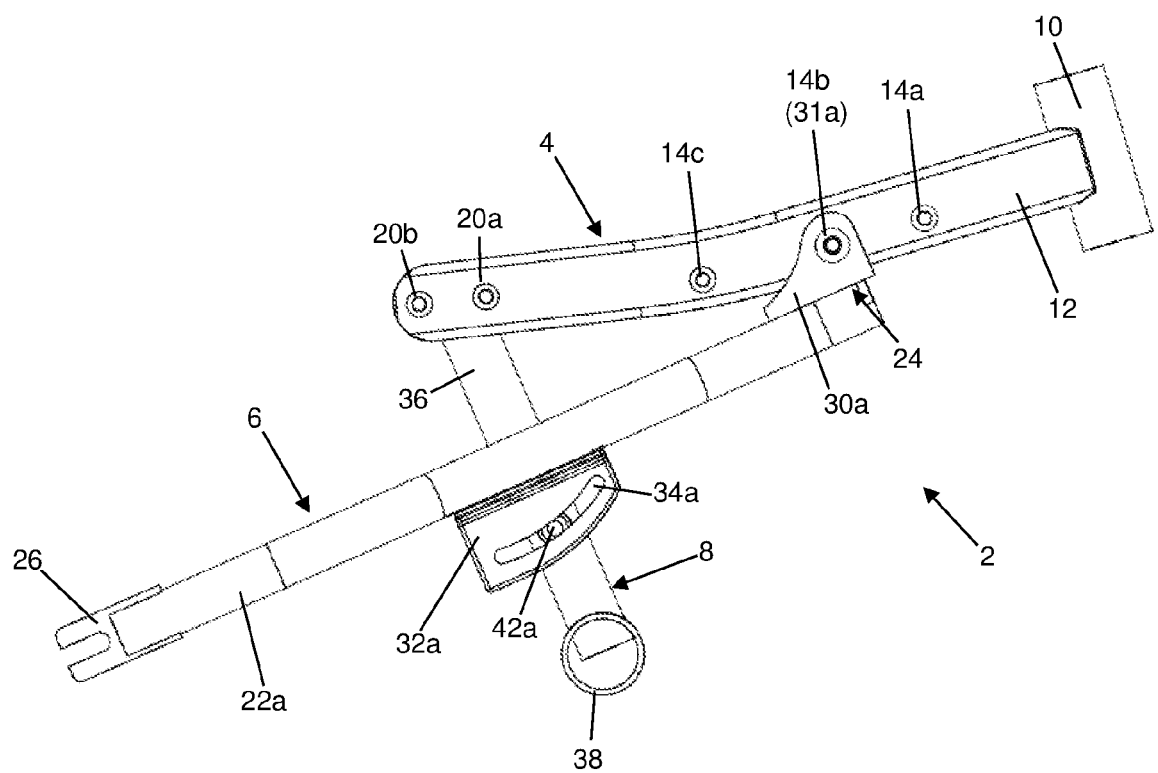
FIG. 3 is a side view of the bicycle frame.

In the following description, the terms "front", "rear", "upper", "lower" and the like are used to describe the relative position of elements. These terms are used in the context of the conventional operation of a bicycle.

FIGS. 1 to 4 show a bicycle frame 2 according to an embodiment of the invention. The frame 2 generally comprises a front portion 4, a rear portion 6 and a connecting member 8.

The front portion 4 comprises a head tube 10 configured to receive a front wheel assembly. The front wheel assembly is formed by a front fork and the front wheel itself, as well as any intermediate components, such as a headset. The front portion 4 further comprises a top tube 12 which extends perpendicularly from the head tube 10. The front portion 4 comprises a plurality (three are shown—designated "front", "middle" and "rear") of mounting holes 14a, 14b, 14c spaced along the length of the top tube 12 between the head tube 10 and a distal end of the top tube 12. The mounting holes 14a, 14b, 14c pass through the thickness of the top tube 12.

Figure 4:
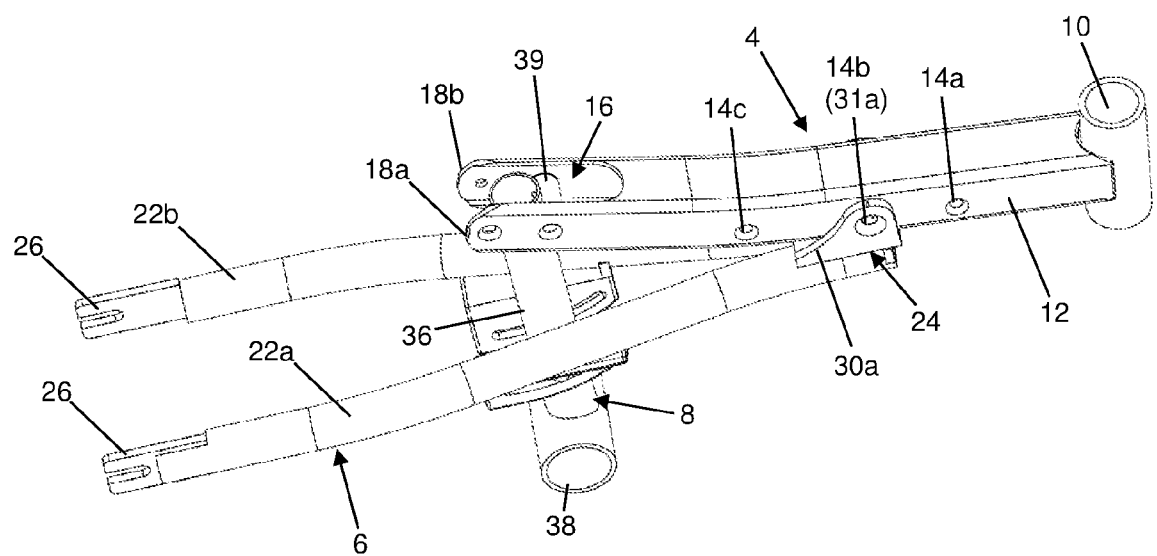
FIG. 4 is a top perspective view of the bicycle frame.

As shown particularly in FIG. 4, the distal end of the top tube 12 is bifurcated to form an open slot 16. Specifically, the distal end of the top tube 12 is formed by a pair of plates 18a, 18b which are parallel to one another but spaced laterally either side of the frame 2. The plates 18a, 18b are each provided with a pair of pivot holes 20a, 20b. The pivot holes 20a, 20b of each plate 18a, 18b are aligned with one another across the slot 16.

The rear portion 6 comprises a pair of rear stays 22a, 22b which are connected to one another at a mounting bracket 24 and which are splayed away from one another to form a rear fork which is configured to receive a rear wheel assembly. A distal end of each rear stay 22a, 22b is provided with a fork-end 26 which is configured to receive a wheel axle. As shown, the fork-ends 26 may comprise an open slot which faces backwards. Alternatively, the fork-ends 26 may have a "dropout" configuration whereby the slot faces downwards or forwards to allow the wheel to be removed without first derailing a belt or chain. As a further alternative, the fork-ends 26 may each have a hole which receives a thru-axle.

The mounting bracket 24 comprises a base plate 28 which connects the rear stays 22a, 22b to one another and a pair of side plates 30a, 30b which extend substantially perpendicularly from either side of the base plate 28. The side plates 30a, 30b are parallel to one another but spaced laterally either side of the frame 2 by a distance which is larger than the thickness of the top tube 12 in the region of the mounting holes 14a, 14b, 14c. The plates 30a, 30b are each provided with a mounting hole 31a, 31b which are aligned with one another.

Each rear stay 22a, 22b is provided with a guide plate 32a, 32b which extends from a lower surface of the rear stay 22a, 22b. The guide plates 32a, 32b are located approximately midway between the mounting bracket 24 and the fork-ends 26. The guide plates 32a, 32b are parallel to one another but spaced laterally either side of the frame 2. Each guide plate 32a, 32b is provided with a curved guide slot 34a, 34b, the formation and function of which will be described in detail below.

The connecting member 8 comprises a seat tube 36 which is configured to receive a seat post assembly comprising a seat post and saddle. The connecting member 8 further comprises a bottom bracket shell 38 which is configured to receive a bottom bracket to which a crankset is mounted. An upper portion of the seat tube 36 is provided with a boss 39 (see FIG. 4) having a through-bore which lies in front of the seat tube 36 and extends laterally across the frame 2. The boss of the seat tube 36 is received within the slot 16 so that the through-bore is aligned with one of the pairs of pivot holes 20a, 20b. A pin (not shown) is passed through the pivot holes 20a, 20b and the through-bore of the boss 39, and is fixed in position using a suitable fastener so as to pivotably connect the connecting member 8 to the front portion 4 (at a first connecting point).

A pair of bosses are provided at either side of the seat tube 36 partway along its length. A threaded guide pin 42a, 42b extends from each of the bosses. The guide pins 42a, 42b are received in the guide slots 34a, 34b of the rear portion 6. The arrangement of the guide slots 34a, 34b and the guide pins 42a, 42b connects the connecting member 8 to the rear portion 6. The arrangement of the guide slots 34a, 34b and the guide pins 42a, 42b forms a pivot (a second connecting point) which allows the rear portion 6 and the connecting member 8 to rotate relative to one another, as well as translate over the length of the guide slots 34a, 34b. The position of the guide pins 42a, 42b along the guide slots 34a, 34b can be fixed using suitable nuts or the like which are threaded onto the guide pins 42a, 42b so as to clamp the guide plates 32a, 32b against the bosses.

As will be appreciated, the front portion 4, the rear portion 6 and the connecting member 8 form a Z-shaped arrangement. The orientation of the connecting member 8 thus determines the vertical and horizontal spacing of the front portion 4 from the rear portion 6.

The connecting member 8 can be fixed in a desired orientation by connecting the mounting bracket 24 of the rear portion 6 to one of the mounting holes 14a, 14b, 14c along the top tube 12 of the front portion 4 (forming a third connecting point). This may be achieved by passing a pin (not shown) through the mounting holes 31a, 31b of the mounting bracket 24 and a selected one of the mounting holes 14a, 14b, 14c and fixing it in position using a suitable fastener. Alternatively, each of the mounting holes 14a, 14b, 14c may be threaded (i.e. by way of a pair of threaded inserts at either side of the top tube 12 or a single insert extending entirely through the top tube 12) and engaged by a pair of screws or the like which are inserted through either mounting hole 31a, 31b. The rear portion 6 is thus indirectly connected to the front portion 4 by the connecting member 8 and then also directly connected to the front portion 4 via the link formed by the section of the rear portion 6 extending between the mounting bracket 24 and the pivot formed by the guide slots 34a, 34b and the guide pins 42a, 42b. The connection of the rear portion 6 to the front portion 4 provides triangulation to the frame 2 and therefore ensures rigidity. Further, as described further below, the link restricts the relative positions of the front and rear portions 4, 6.

Figure 5:
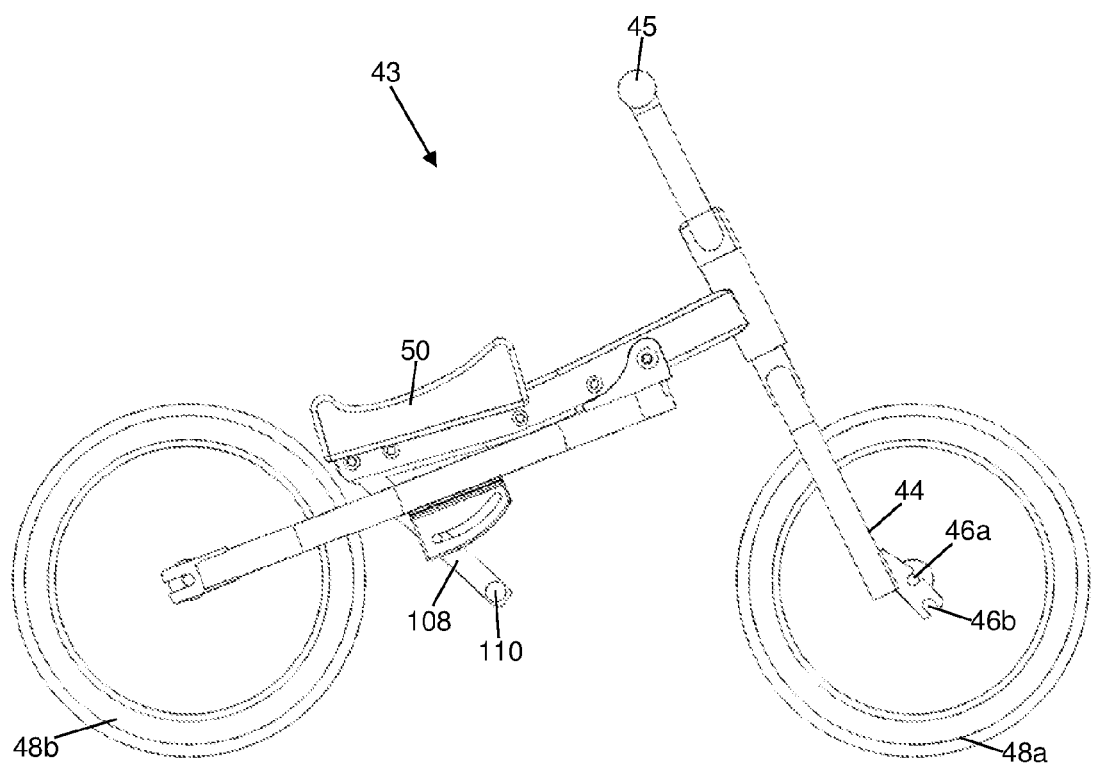
FIG. 5 is a side view of a bicycle comprising the bicycle frame in a first balance bicycle configuration.
Figure 6:
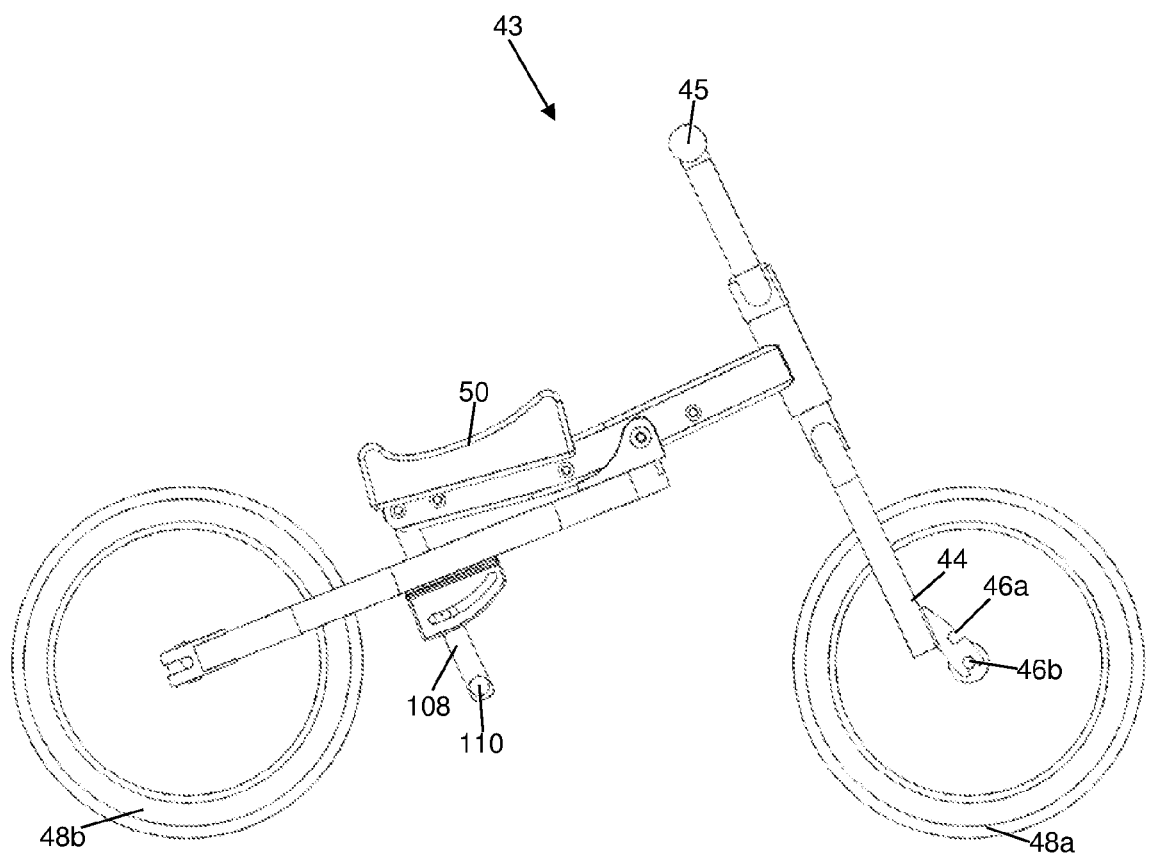
FIG. 6 is a side view of the bicycle in a second balance bicycle configuration.

FIGS. 5 and 6 show the frame 2 assembled into a balance bicycle 43. A balance bicycle (or run bike) is a training bicycle that helps children learn balance and steering. As shown, the balance bicycle 43 is not provided with a drivetrain (i.e. pedals, crankset, chain, etc.) or brakes, and does not have training wheels.

A front fork 44 is received by the head tube 10 of the frame 2. The front fork 44 passes through the head tube 10 and is connected to a handlebar 45 in a conventional manner. The front fork 44 comprises first and second pairs of fork-ends 46a, 46b. Each fork-end 46a, 46b may be formed as an open dropout. Alternatively, the fork-ends 46a, 46b may have a hole which receives a thru-axle. The first and second pairs of fork-ends 46a, 46b are spaced different distances from the head tube 10 so as to accommodate wheels of different sizes. In the balance bicycle configuration, a smaller front wheel 48a is used, preferably a standard 10" (diameter) wheel. The front wheel 48a is located in the upper pair of fork ends 46a so as to lower the front of the balance bicycle 43. Similarly, a standard 10" wheel 48b is located in the rear fork-ends 26. A seat pad 50 is affixed to the top tube 12 of the frame 2. As shown, the seat pad 50 extends past and may cover the rear mounting hole 14c which is not needed for the balance bicycle configuration.

As shown, in the balance bicycle configuration, the connecting member 8 is removed from the frame 2 and replaced by connecting member 108. The connecting member 108 is connected to the front and rear portions 4, 6 in a similar manner to the connecting member 8, but is provided with a pair of footpegs 110 at its distal, free end, instead of the bottom bracket shell 38. The footpegs 110 extend laterally from either side of the connecting member 108 and can be used to support the child. The connecting member 8 may be provided with a detachable lower section which carries the bottom bracket shell 38 and may be removed and replaced with a lower section having the footpegs 110 to form the replacement connecting member 108 (utilizing guide pins located in an appropriate position). Alternatively, the footpegs 110 may be received by the bottom bracket shell 38 itself.

FIG. 5 shows the balance bicycle 43 in a first, smaller mode where the rear portion 6 is connected to the front portion 4 via the front mounting hole 14a.

In this smaller configuration, the connecting member 108 is angled furthest away from vertical, thus reducing the vertical and horizontal distances between the front and rear portions 4, 6. As a result, the frame 2 is at its smallest size, as defined by its vertical and horizontal dimensions, and thus will be suitable for the smallest children.

Specifically, the orientation of the connecting member 8 draws the rear wheel 48b (i.e. rear axle) and footpegs 110 horizontally towards the front wheel 48a and the head tube 10. This minimizes the horizontal dimensions of wheelbase (the separation between the front and rear axles), reach (the horizontal separation between the footpegs 110 and the top of the head tube 10) and axle-reach (as per reach, but measured from the rear axle rather than the footpegs 110).

The orientation of the connecting member 8 also draws the footpegs 110 vertically towards the head tube 10. This increases the angle of the top tube 12 and decreases the angle of the head tube 10 (from horizontal). As a result, the vertical dimensions of stack (the vertical separation between the footpegs 110 and the top of the head tube), axle-stack (as per stack, but measured from the rear axle rather than the footpegs 110), head tube height, top tube height (both at the front and rear), standover height and seat height are all minimized.

The slack head angle also increases the trail of the front fork 44, thereby providing slower steering characteristics and thus improved stability. The orientation of the connecting member 8 also raises the height of the footpegs 110 so as to reduce the vertical distance between the footpegs 110 and the seat pad 50.

As shown in FIG. 6, once the child has outgrown the smaller configuration, the balance bicycle 43 can be transitioned to a second, larger configuration where the rear portion 6 is connected to the front portion 4 via the middle mounting hole 14b.

In the larger configuration, the connecting member 108 is pivoted toward vertical about the rear pivot hole 20b. As a result, the previously described vertical and horizontal dimensions of the balance bicycle 43 are increased simultaneously. In addition, the angle of the top tube 12 decreases and the angle of the head tube 10 increases.

The front wheel 48a may also be moved into the lower pair of fork ends 46b so as to raise the front of the balance bicycle 43.

Figure 7:
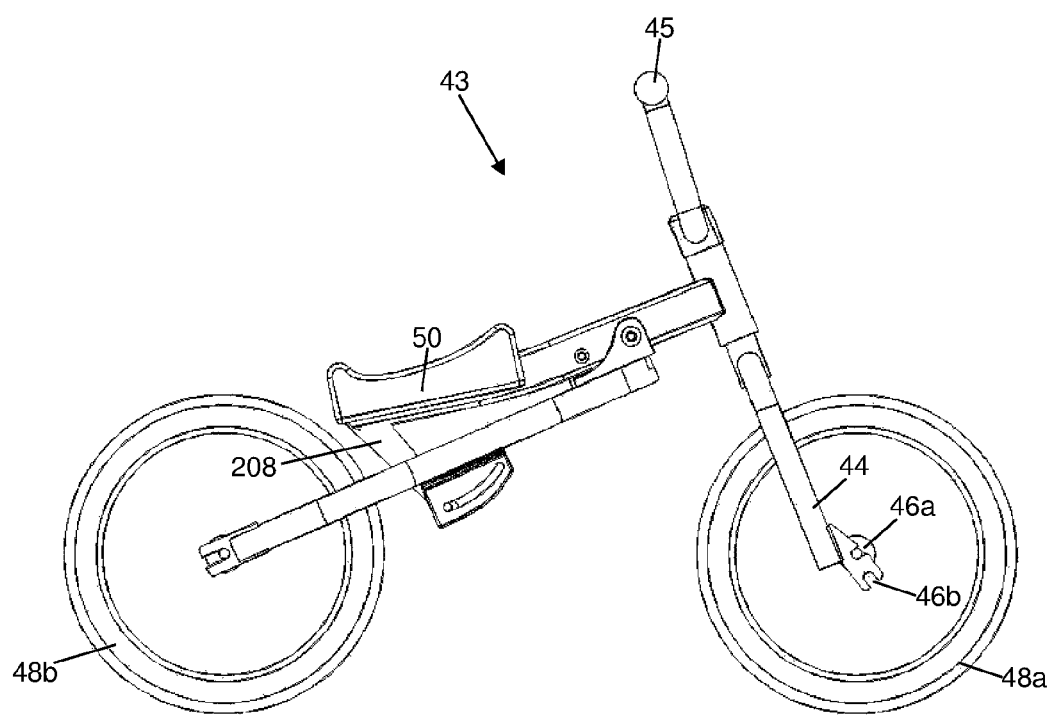
FIGS. 7 and 8 show an alternative arrangement for placing the bicycle in the first and second balance bicycle configurations.
Figure 8:
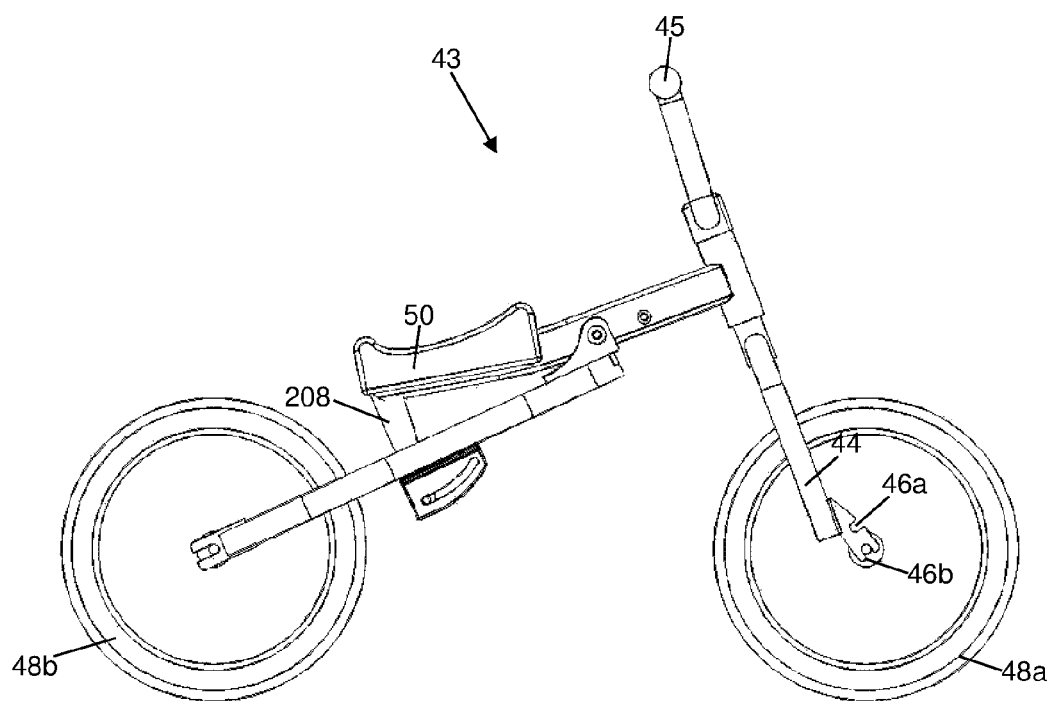
Figure 9:
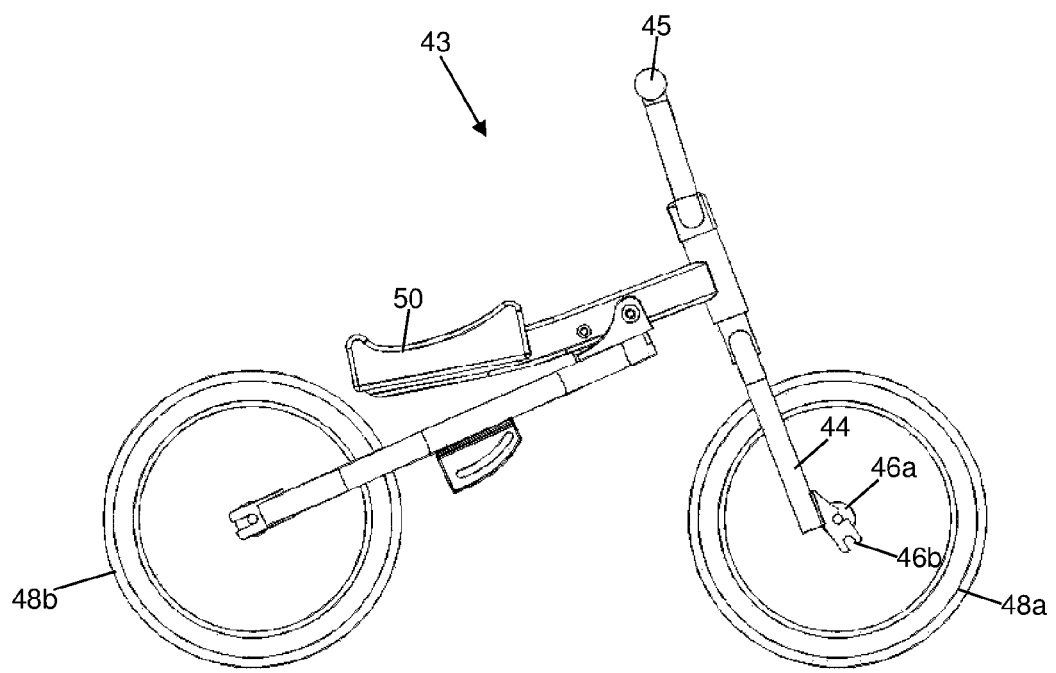
FIGS. 9 and 10 show a further alternative arrangement for placing the bicycle in the first and second balance bicycle configurations.
Figure 10:
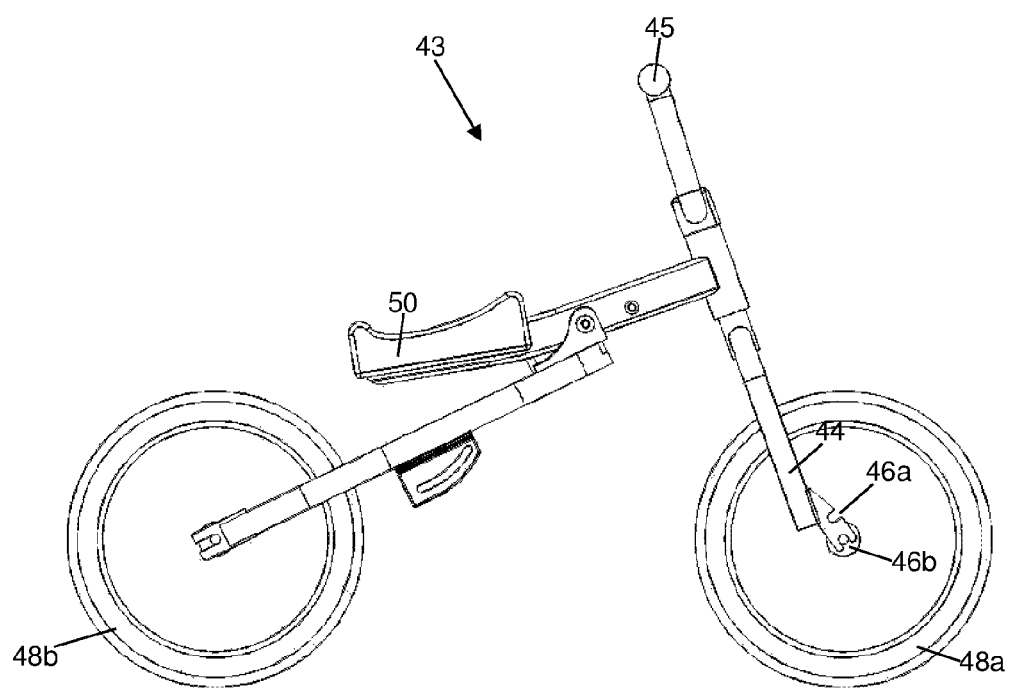
Figure 11:
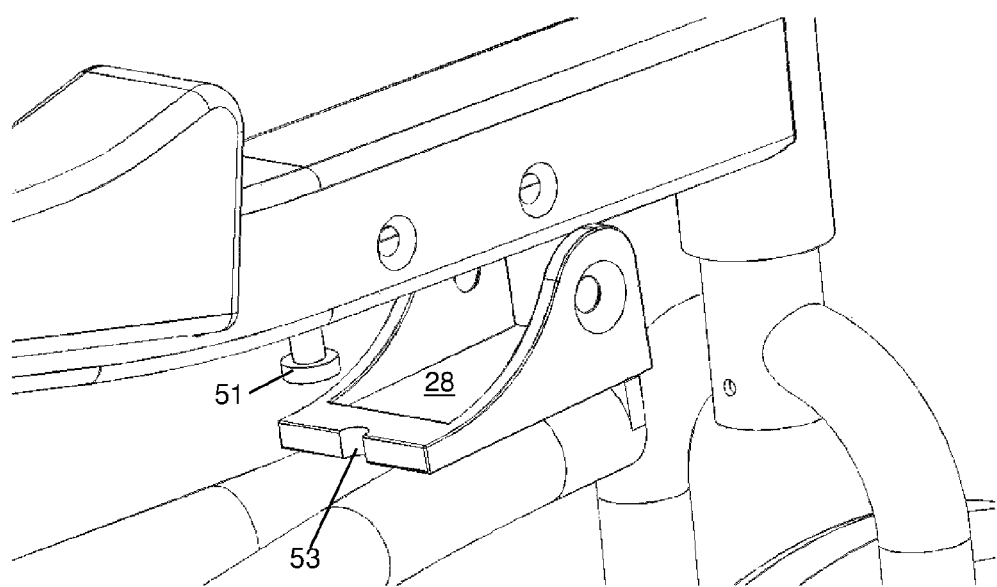
FIG. 11 is an enlarged view of the bicycle of FIGS. 9 and 10 showing a hook and notch arrangement used in the balance bicycle configuration in a disassembled state.
Figure 12:
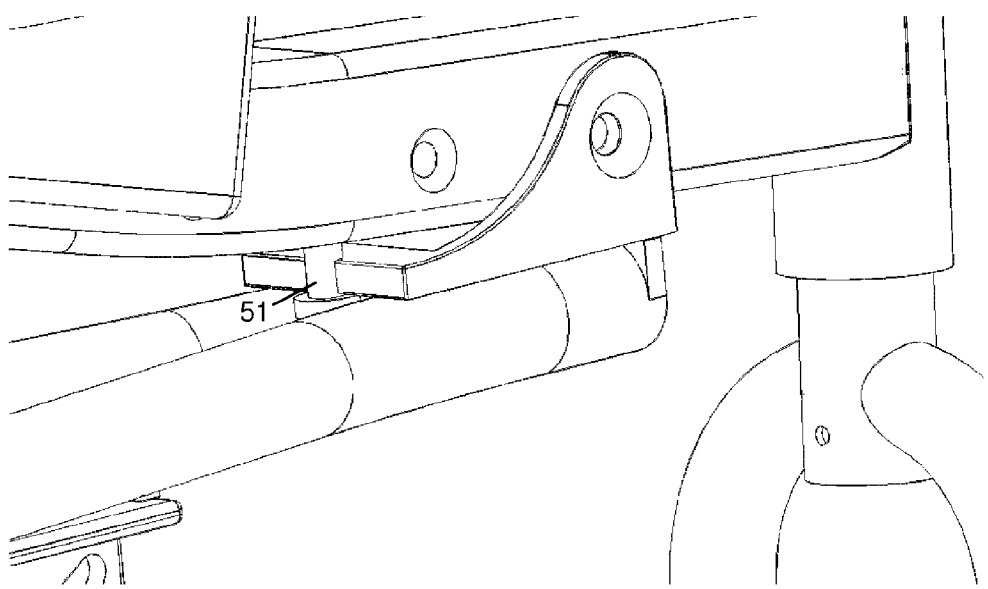
FIG. 12 shows the hook and notch arrangement of FIG. 11 in an assembled state.

Alternatively, as shown in FIGS. 7 and 8, a replacement connecting member 208 may be used which does not project past the connection with the rear portion 6. The connecting member 8 may be provided with a detachable lower section which carries the bottom bracket shell 38 and may be removed to form the replacement connecting member 208 (utilizing guide pins located in an appropriate position).

Alternatively, as shown in FIGS. 9 to 12, the connecting member 8 may be removed and the front and rear portions 4, 6 prevented from rotating relative to one another by an arrangement comprising a hook 51 (i.e. a connecting member) and a notch 53 (or hole). The hook 51 projects from an underside of the top tube 12 at a position which is rearward of the mounting holes 14a, 14b and the notch 53 is formed in the base plate 28 of the mounting bracket 24. The hook 51 is formed by a tubular portion which extends from the top tube 12 and is provided with an enlarged head at its distal end. The base plate 28 is received between the top tube 12 and the enlarged head of the hook 51 such that the tubular portion sits in the notch 53. The enlarged head of the hook 51 therefore prevents the base plate 28 and thus the rear portion 6 from moving away from the top tube 12. The enlarged head of the hook 51 and the notch 53 may be chamfered to allow for different mating angles.

The hook 51 may engage in separate notches 53 provided in the base plate 28 at appropriate positions for the smaller and larger configurations of the balance bicycle 43. Alternatively, the hook 51 may be moved along the top tube 12 to positions which conform to the position of the notch 53 when the rear portion 6 is connected to the front portion 4 via the front and middle mounting holes 14a, 14b. For example, the underside of the top tube 12 may be provided with a pair of threaded bosses which are spaced from one another, so that the hook 51 can be screwed into the appropriate boss for the desired configuration of the balance bicycle 43.

The transition from the smaller configuration to the larger configuration simultaneously increases both the wheelbase and the height of the seat pad 50. The balance bicycle 43 is thus able to grow with the child. The balance bicycle 43 is generally suitable for children aged 2 to 5 years old and of a height of between 85 cm and 110 cm.

The transition from the smaller configuration to the larger configuration also decreases the angle of the top tube 12 and increases the angle of the head tube 10 (from horizontal). In the smaller configuration, the slack head angle increases the trail of the front fork 44, thereby providing slower steering characteristics and thus improved stability for younger users. As described previously, during the transition from the smaller configuration to the larger configuration, the front wheel 48a may be moved into the lower pair of fork ends 46b so as to raise the front of the balance bicycle 43. Accordingly, the change in the angles of the top tube 12 and the head tube 10 brought about by the change in position of the front and rear portions 4, 6 also offsets the change in these angles resulting from the change in wheel position.

Figure 13:
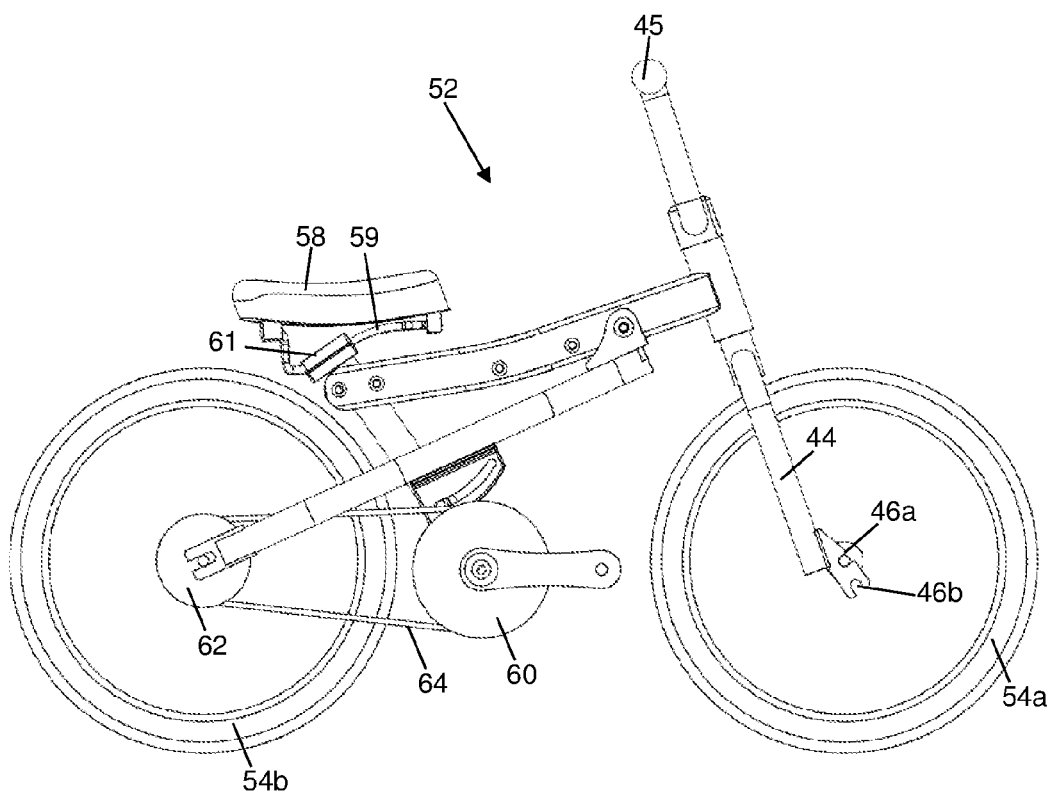
FIG. 13 is a side view of the bicycle in a first pedal bicycle configuration.

After the child has become proficient with balance and steering and has outgrown the larger configuration, the balance bicycle 43 can be converted into a pedal bicycle 52, as shown in FIG. 13.

To convert the balance bicycle 43 into the pedal bicycle 52, the connecting member 8 is attached between the front and rear portions 4, 6. The wheels 48a, 48b are replaced by a larger pair of wheels 54a, 54b, preferably 14" wheels. The front wheel 54a is again located in the upper pair of fork ends 46a. Front and/or rear brakes (not shown) are also fitted.

The seat tube 36 of the connecting member 8 receives a seat post 56 (see FIG. 14) which carries a saddle 58. The seat post 56 is telescopically received in the seat tube 36 and thus can slide relative to the seat tube 36 to vary the height of the saddle 58. The saddle 58 is connected to the seat post 56 by a pair of rails 59 which are received by a clamp 61 of the seat post 56. The rails 59 are curved along their length such that, at the front of the saddle 58, the rails 59 are substantially parallel to an upper surface of the saddle 58 and, at the rear of the saddle 58, the rails 59 are angled away from the saddle 58. Similarly, the clamp 61 is curved along its length to conform to the curvature of the rails 59.

The bottom bracket shell 38 of the connecting member 8 receives a crankset 60 which in turn receives a pair of pedals (not shown). The crankset 60 carries a front sprocket.

The rear wheel 54b is provided with a rear sprocket assembly 62 which will be described in further detail below. The crankset 60 and rear sprocket assembly 62 are connected by a toothed belt 64, chain or the like.

FIG. 13 shows the bicycle 52 in a first, small configuration. In this configuration, the connecting member 8 is connected to the front portion 4 via the front pivot hole 20a. The orientation of the connecting member 8, and thus the relative positions of the front and rear portions 4, 6, is fixed by the link formed by the connection of the rear portion 6 to the front portion 4.

In this configuration, the connecting member 8 is angled furthest away from vertical, thus reducing the vertical and horizontal distances between the front and rear portions 4, 6. As a result, the frame 2 is at its minimum size as defined by its vertical and horizontal dimensions.

Specifically, the orientation of the connecting member 8 draws the rear wheel 54b (i.e. rear axle) and crankset 60 (i.e. bottom bracket) horizontally towards the front wheel 54a and the head tube 10. This minimizes the horizontal dimensions of wheelbase (the separation between the front and rear axles), reach (the horizontal separation between the bottom bracket and the top of the head tube) and axle-reach (as per reach, but measured from the rear axle rather than the bottom bracket).

The orientation of the connecting member 8 also draws the crankset 60 (i.e. bottom bracket) vertically towards the head tube 10. This increases the angle of the top tube 12 and decreases the angle of the head tube 10 (from horizontal). As a result, the vertical dimensions of stack (the vertical separation between the bottom bracket and the top of the head tube), axle-stack (as per stack, but measured from the rear axle rather than the bottom bracket), head tube height, top tube height (both at the front and rear), standover height and minimum saddle height (defined by the top of the seat tube) are all minimized.

The angle of the connecting member 8 also results in the crankset 60 being located forward of the saddle 58 which is more suitable for learners. In addition, the slack head angle increases the trail of the front fork 44, thereby providing slower steering characteristics and thus improved stability. The orientation of the connecting member 8 also raises the height of the bottom bracket so as to reduce the vertical distance between the bottom bracket shell 38 and the saddle 58.

In this configuration, the saddle 58 is located towards the front of the bicycle 52 such that the clamp 61 of the seat post 56 connects towards the rear of the rails 59. Accordingly, the angle between the upper surface of the saddle 58 and the seat post 56 (measured from the front of the saddle 58 downwards to the seat post 56), and thus the seat tube 36 of the connecting member 8, is reduced so that the upper surface of the saddle 58 is substantially level. This also reduces the distance between the saddle 58 and the handlebar 45.

The orientation of the connecting member 8 can be finely adjusted by translating the guide pins 42a, 42b along the guide slots 34a, 34b. Specifically, as shown, the guide pins 42a, 42b are translated forward along the guide slots 34a, 34b so as to reduce the distance between the second and third connecting points. This also controls the distance between the crankset 60 and the rear sprocket assembly 62 (which may be used to maintain a constant distance) in order to maintain an appropriate tension in the belt 64. A lead screw arrangement (not shown) may be provided to drive the guide pins 42a, 42b forward along the guide slots 34a, 34b for this purpose. Alternatively, the tension of the belt 64 may be adjusted by altering the position of the rear wheel 54b.

The guide slots 34a, 34b may be provided with a visual or tactile indication of the appropriate position for the guide pins 42a, 42b for each size configuration. For example, the guide slots 34a, 34b may be provided with a visual marker which indicates the position for each size configuration. Alternatively, the guide slots 34a, 34b may be provided with a plurality of recesses which receive the nuts screwed onto the guide pins 42a, 42b when positioned appropriately.

Figure 14:
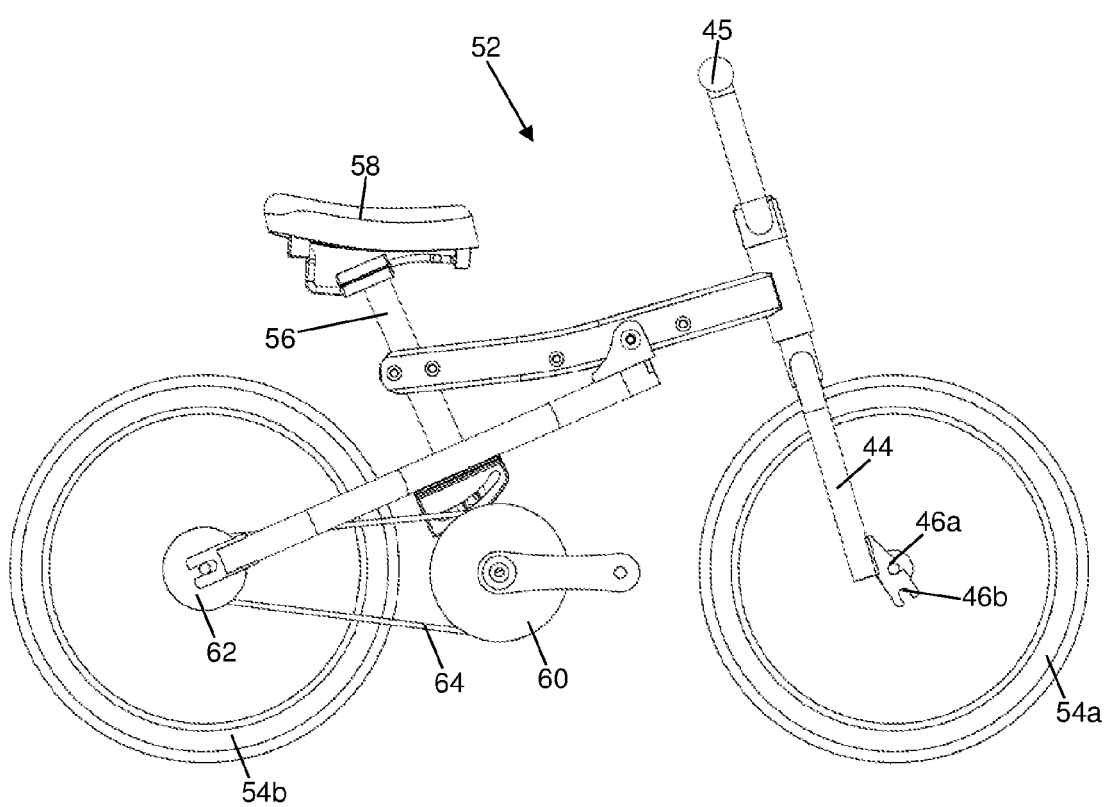
FIG. 14 is a side view of the bicycle in a second pedal bicycle configuration.

Once the child has outgrown the small configuration, the bicycle 52 can be transitioned to a medium configuration, as shown in FIG. 14.

In the medium configuration, the connecting member 8 is pivoted toward vertical about the front pivot hole 20a and the rear portion 6 is connected to the front portion 4 via the middle mounting hole 14b to fix the orientation of the connecting member 8. This reduces the distance between the first and third connecting points and increases the vertical and horizontal distances between the front and rear portions 4, 6. As a result, the previously described vertical and horizontal dimensions of the bicycle 52 are increased simultaneously. The crankset 60 is also brought more underneath the saddle 58 giving a more efficient riding position. In addition, the angle of the top tube 12 decreases and the angle of the head tube 10 increases.

To counteract the change in angle of the connecting member 8, the saddle 58 is moved rearward so as to increase the angle between the upper surface of the saddle 58 and the seat post 56 (measured from the front of the saddle 58 downwards to the seat post 56). As a result, the upper surface of the saddle 58 remains substantially level. This also increases the distance between the saddle 58 and the handlebar 45. The saddle 58 is also raised to allow for the longer legs of the child.

Again, the orientation of the connecting member 8 can be finely adjusted by translating the guide pins 42a, 42b along the guide slots 34a, 34b to reduce the distance between the second and third connecting points and to maintain appropriate tension in the belt 64.

Figure 15:
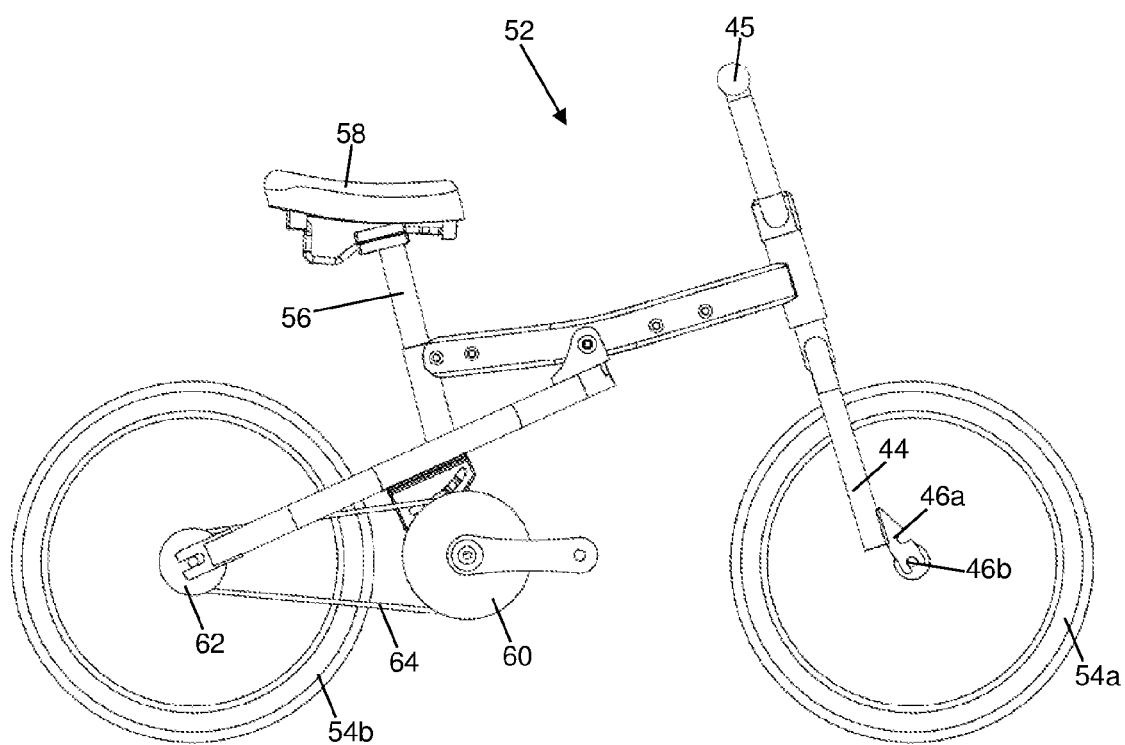
FIG. 15 is a side view of the bicycle in a third pedal bicycle configuration.

Once the child has outgrown the medium configuration, the bicycle 52 can be transitioned to a large configuration, as shown in FIG. 15.

In the large configuration, the connecting member 8 is instead connected to the rear pivot hole 20b so as to move the connecting member 8 (and saddle 58) rearward. The rear portion 6 is connected to the front portion 4 via the rear mounting hole 14c to fix the orientation of the connecting member 8. This further reduces the distance between the first and third connecting points and further increases the vertical and horizontal distances between the front and rear portions 4, 6. As a result, the previously described vertical and horizontal dimensions of the bicycle 52 are further increased to their maximum values. The crankset 60 is also brought further underneath the saddle 58 giving a more efficient riding position. In addition, the angle of the top tube 12 further decreases and the angle of the head tube 10 further increases.

Moving the connecting member 8 between the pivot holes 20a, 20b minimizes the change in angle of the connecting member 8 as the frame 2 transitions from the small to the large configurations. This avoids the pedals being located too far in front of the saddle 58 when in the small configuration.

To counteract the change in angle of the connecting member 8, the saddle 58 is moved further rearward so as to increase the angle between the upper surface of the saddle 58 and the seat post 56 (measured from the front of the saddle 58 downwards to the seat post 56). As a result, the upper surface of the saddle 58 remains substantially level. This also increases the distance between the saddle 58 and the handlebar 45. The saddle 58 is also raised further to allow for the longer legs of the child.

Again, the orientation of the connecting member 8 can be finely adjusted by translating the guide pins 42a, 42b along the guide slots 34a, 34b to reduce the distance between the second and third connecting points and to maintain appropriate tension in the belt 64.

In this configuration, the front wheel 54a may also be replaced by a larger wheel (i.e. a 16" wheel). This may be located in the lower pair of fork ends 46b. The upper and lower pairs of fork ends 46a, 46b are offset from one another by a distance which corresponds to the difference in size (the radius) between the wheels. Consequently, the position of the rim remains constant between the wheels so that no (or very little) adjustment of the front brake is required.

When in the small configuration, the bicycle 52 is generally suitable for children aged 2 to 4 years old and of a height of between 85 cm and 100 cm. In the medium configuration, the bicycle 52 is generally suitable for children aged 3 to 5 years old and of a height of between 95 cm and 110 cm. In the large configuration, the bicycle 52 is generally suitable for children aged 5 to 7 years old and of a height of between 110 cm and 120 cm.

As described, the relative positions of the front and rear portions 4, 6 and the orientation of the connecting member 8 are altered simply by changing the mounting hole 14a, 14b, 14c used to connect the rear portion 6 to the front portion 4 (possibly with an additional transition between the pivot holes 20a, 20b). The direct connection between the front and rear portions 4, 6 restricts the frame 2 to predefined, optimized positions of the front and rear portions 4, 6 relative to one another. These optimized positions are designed to provide a frame which replicates a purpose-built frame of the desired size.

Figure 16:
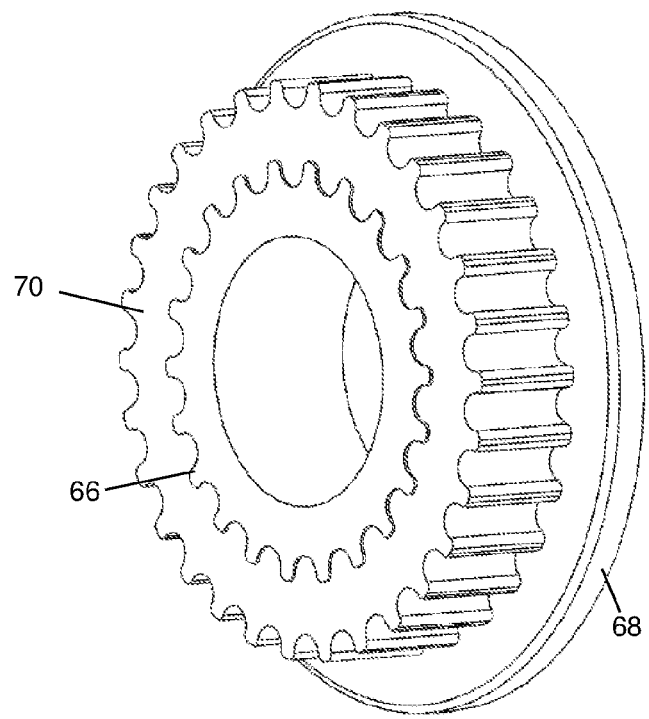
FIG. 16 is a perspective view of a rear sprocket assembly configured for the first pedal bicycle configuration.

As the child grows and increases in strength, they will not only outgrow the physical size of the frame 2 (requiring conversion between the different size configurations), but will also outgrow the gearing of the bicycle 52, as defined by the crankset 60 and rear sprocket assembly 62. Accordingly, at each size transition, there is also an associated change in the gearing of the bicycle 52. This may be achieved using the rear sprocket assembly 62 shown in FIG. 16.

As shown, the rear sprocket assembly 62 comprises an inner sprocket 66 which is connected to or integrally formed with a back plate 68. The inner sprocket 66 is provided with a number of teeth (22 are shown) which project radially.

For the small configuration, a large annular sprocket 70 is disposed over the inner sprocket 66. Inner and outer surfaces of the large annular sprocket 70 are provided with teeth. The teeth of the inner surface conform to the teeth of the inner sprocket 66 such that the large annular sprocket 70 can be received over and engaged with the inner sprocket 66. The teeth of the outer surface have the same profile and spacing as the teeth of the inner surface (and of the inner sprocket 66), but, owing to the larger diameter of the outer surface, there are a greater number of teeth on the outer surface (30 are shown) than on the inner surface of the large annular sprocket 70 (and on the inner sprocket 66).

Figure 17:
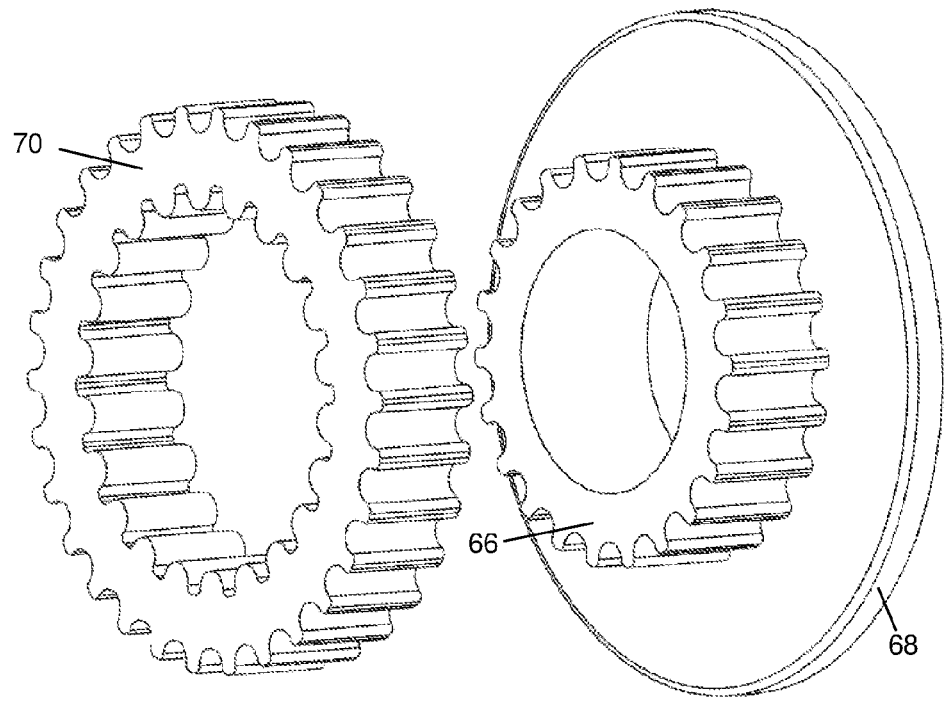
FIG. 17 is a perspective view of the rear sprocket assembly in a disassembled state.
Figure 18:
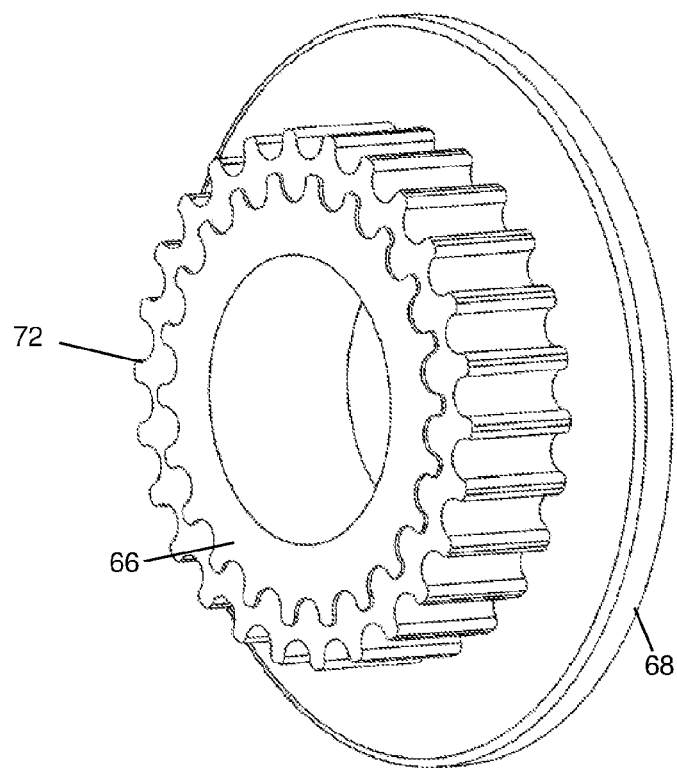
FIG. 18 is a perspective view of the rear sprocket assembly configured for the second pedal bicycle configuration.

When converting the bicycle 52 from the small configuration to the medium configuration, the large annular sprocket 70 is removed, as shown in FIG. 17. This is achieved by removing the rear wheel 54b from the frame 2 and sliding the large annular sprocket 70 axially relative to the inner sprocket 66. The large annular sprocket 70 is then replaced with a medium annular sprocket 72, as shown in FIG. 18.

As per the large annular sprocket 70, the medium annular sprocket 72 has an inner surface with teeth which conform to the teeth of the inner sprocket 66. An outer surface of the medium annular sprocket 72 is also provided with teeth. The diameter of the outer surface of the medium annular sprocket 72 is smaller than that of the large annular sprocket 70 such that the medium annular sprocket 72 has fewer teeth (26 are shown). This thus increases the gearing of the bicycle 52.

Figure 19:
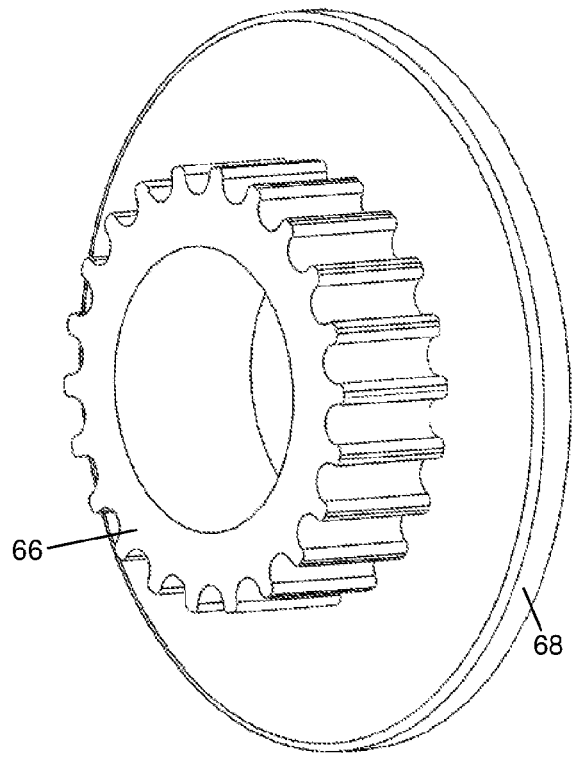
FIG. 19 is a perspective view of the rear sprocket assembly configured for the third pedal bicycle configuration.

When converting the bicycle 52 from the medium configuration to the large configuration, the medium annular sprocket 72 is removed, as shown in FIG. 19, and the belt 64 engages directly with the inner sprocket 66. This further increases the gearing of the bicycle 52.

Alternatively, the medium annular sprocket 72 may be nested between the inner sprocket 66 and the large annular sprocket 70 such that the inner surface of the large annular sprocket 70 conforms to the outer surface of the medium annular sprocket 72. The large annular sprocket 70 and medium annular sprocket 72 are therefore removed sequentially at each transition in size.

Figure 20:
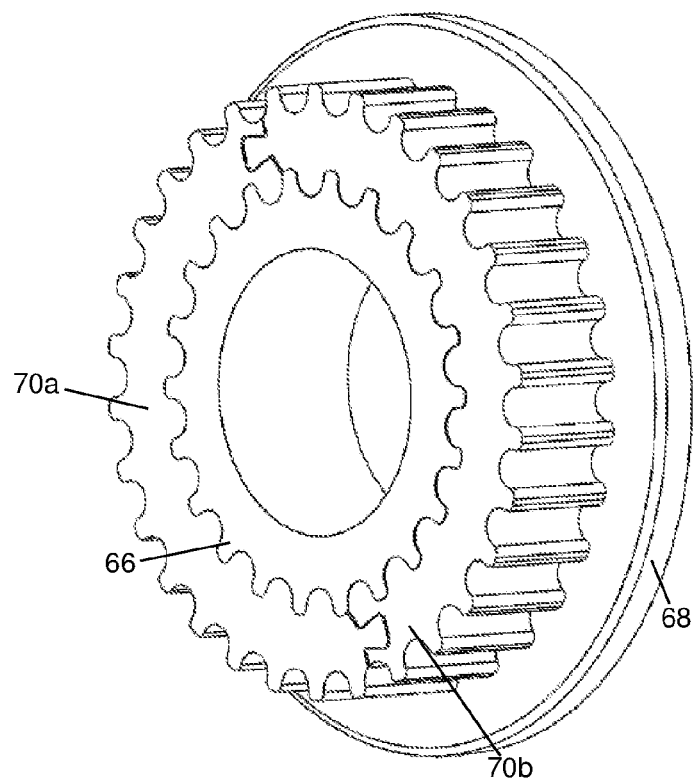
FIG. 20 is a perspective view of an alternative rear sprocket assembly.
Figure 21:
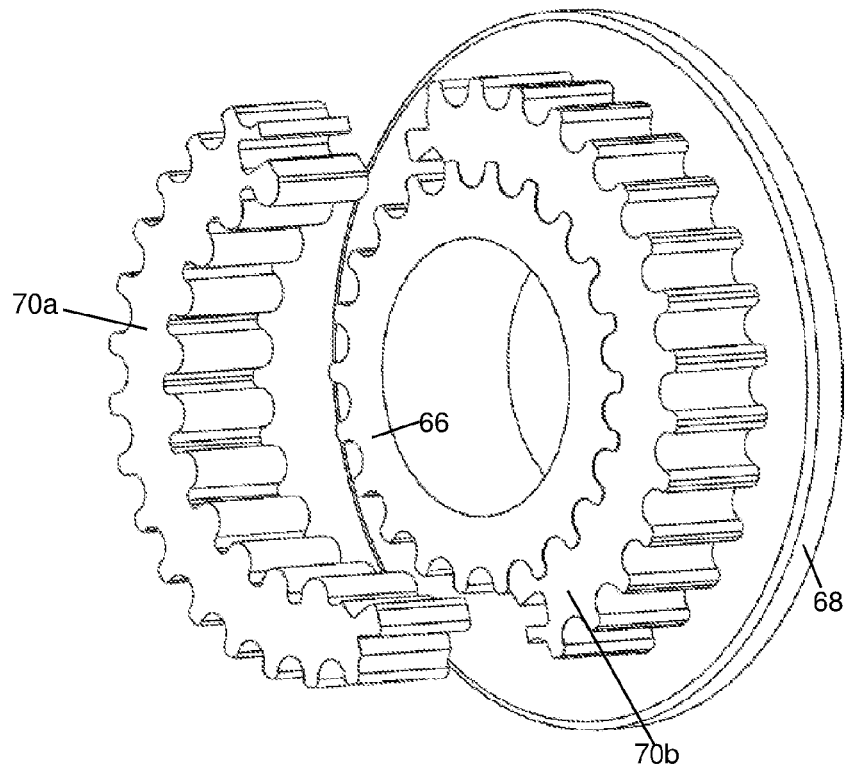
FIG. 21 is a perspective view of the alternative rear sprocket assembly in a partially disassembled state.

As shown in FIGS. 20 and 21, the large annular sprocket 70 may be formed as two semi-circular halves 70a, 70b (or more than two segments) which are connected to one another using a suitable interlocking joint, such as a dovetail joint. The two halves 70a, 70b may be retained using a grub screw or similar. The medium annular sprocket 72 may also be formed in this manner. This allows the large annular sprocket 70 and medium annular sprocket 72 to be removed from and attached to the inner sprocket 66 without removing the rear wheel 54b from the frame 2.

To maintain a constant belt length while the gearing is adjusted as described above, the guide pins 42a, 42b are translated along the guide slots 34a, 34b to move the bottom bracket shell 38 of the connecting member 8 and thus the crankset 60 away from the rear sprocket assembly 62. Once the belt 64 is under sufficient tension, the connecting member 8 and thus the front and rear portions 4, 6 are in the desired position and orientation for that size configuration.

As an alternative (or in addition), a similar arrangement to the rear sprocket assembly 62 described above may be used at the crankset 60. With this arrangement, the size of the sprocket at the crankset 60 would increase in size as the frame 2 is converted from the small to large. This may therefore offset the reduction in the distance between the crankset 60 and rear sprocket assembly 62, maintaining a substantially constant belt tension without having to translate the guide pins 42a, 42b along the guide slots 34a, 34b.

The convertible sprocket assembly may be used to change the gear ratio in any bicycle and is not limited to the adjustable frame described above. It will be appreciated that the inner surface of the annular sprocket(s) may have fewer teeth compared to the inner sprocket such that the teeth provided on the inner surface of the annular sprocket(s) engage with only some of the teeth on the inner sprocket.

Figure 22:
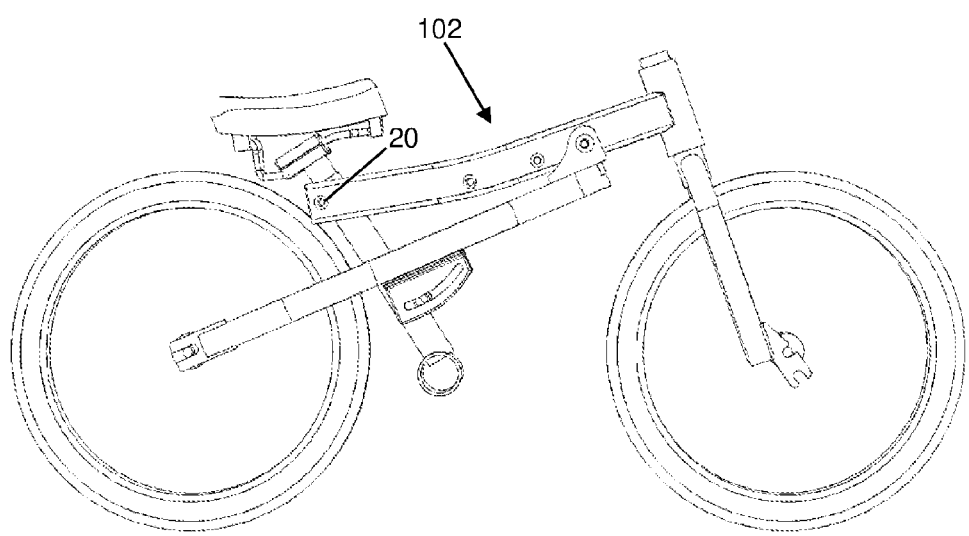
FIG. 22 is a side view of a bicycle having a frame according to another embodiment of the invention in a first pedal bicycle configuration.
Figure 23:
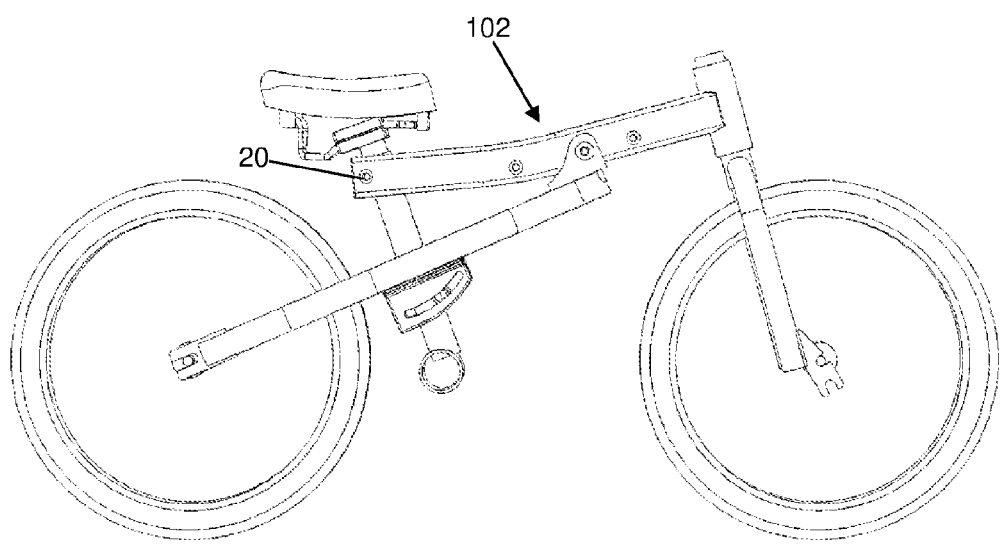
FIG. 23 is a side view of the bicycle of FIG. 22 in a second pedal bicycle configuration.
Figure 24:
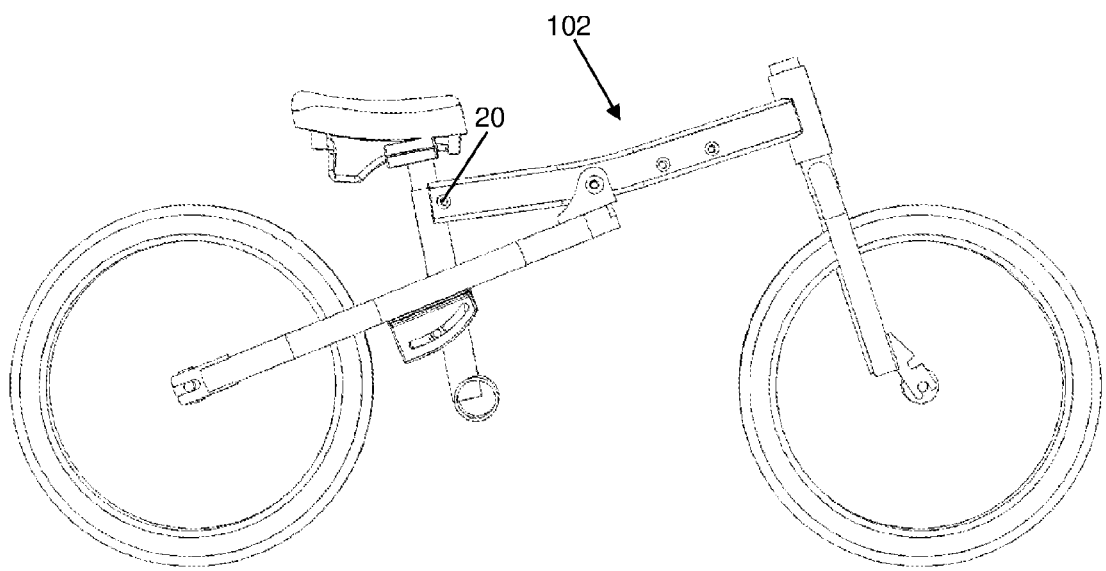
FIG. 24 is a side view of the bicycle of FIG. 22 in a third pedal bicycle configuration.

FIGS. 22 to 24 show an alternative embodiment of the frame 2. The frame 102 of this embodiment differs from the frame 2 in that the top tube 12 is provided with only a single pivot hole 20. In the small and medium configurations, the connecting member 8 is arranged so that the boss 39 which connects the connecting member 8 to the pivot hole 20 is instead located behind the seat tube 36.

During the transition between the medium and large configurations (shown in FIGS. 23 and 24), the connecting member 8 is rotated about its longitudinal axis so that the boss 39 lies in front of the seat tube 36. As the boss 39 is offset from the axis of the seat tube 36, this causes the connecting member 8 to be moved rearward.

As per the boss 39, the bottom bracket shell 38 is also offset in the same direction from the axis of the seat tube 36. Accordingly, as the connecting member 8 is rotated during the transition from the medium to large configuration, the bottom bracket shell 38 and thus the crankset 60 translate forwards. This avoids the crankset 60 from moving too far underneath the saddle 58 and thus maintains a slightly crank-forward position. The rotation of the connecting member 8 also increases the distance between the crankset 60 and the rear sprocket assembly 62 which allows the inner sprocket 66 to be used so as to increase the gearing, as described previously.

The bracing of the rear portion 6 against the front portion 4 (the link) may be achieved in other manners than that described previously. For example, the front portion 4 may extend past the pivot with the connecting member 8 and connect to the rear portion 6. Accordingly, the rear portion 6 may be provided with a plurality of mounting holes and the front portion may be provided with a guide slot for tensioning the belt 64. Further, the front portion 4 may connect directly to the rear portion 6 in only a single position (which may or may not be removable) and the effective length of the link (the distance between the second and third connecting points) adjusted using a telescopic arrangement. In this instance, part of the telescopic arrangement may be considered as forming a section of the front portion 4 and another part of the telescopic arrangement may be considered as forming a section of the rear portion 6. Accordingly, the front and rear portions 4, 6 need not be unitary elements and may be provided with one or more additional elements which form the link between the two portions. The link may therefore be detachable from both the front and rear portions 4, 6 and thus only be notionally ascribed as being part of the front or rear portion 4, 6. The link must, however, restrict the relative positions of the front and rear portions 4, 6.

If desired, the frame 2 may be provided with a suitable shock absorbing arrangement. For example, one or more of the connections between the front portion 4, the rear portion 6 and the connecting member 8 may comprise an elastomeric portion, such as a bushing, which provides some damping. Alternatively, a shock absorber may be provided, such as in-line with the connecting member 8. Where any movement of the relative positions between the front portion 4, the rear portion 6 and the connecting member 8 is permitted by such suspension designs, it will be appreciated that the different size configurations refer to the resting or static geometry of the frame without any load.

Although the frame 2 has been described as having discrete mounting holes 14a, 14b, 14c and pivot holes 20a, 20b, they may instead each be embodied as a slot (on either portion) which allows the position of attachment to be continuously varied or an enlarged opening which houses an insert or carrier (a flip chip) which can be reoriented within the opening to allow the position of attachment to follow a linear or non-linear path. Indeed, as described above, the front portion 4 may connect directly to the rear portion 6 in only a single position. On the other hand, the guide slot 34a, 34b may instead be embodied as several discrete mounting holes (or slots in order to still provide some adjustment for tensioning the belt 64). Again, the guide slot 34a, 34b may instead be formed as an enlarged opening which houses an insert or carrier (a flip chip) which can be reoriented within the opening to allow the position of attachment to follow a linear or non-linear path. Although the guide slot 34a, 34b has been described as being curved, it may instead be straight or may be formed by a series of portions which are angled with respect to one another to form a zigzag or stepped slot.

The connecting member 8 may be removed from the frame 2 in order to allow the frame 2 to be folded to a more compact size for transportation.

Although the saddle 58 and seat post 56 have been described as having curved rails 59 and a curved clamp 61, it will be appreciated that this arrangement could be reversed. Further, a single central rail or other guide may be used having a slot-type arrangement. The seat post 56 may also be omitted and the saddle 58 connected directly to the top tube 12 or connecting member 8. Where the saddle 58 is connected directly to the top tube 12, only minimal (or no) adjustment of the angle of the saddle 58 may be required, so that the curved rails 58 and clamp 61 can be dispensed with.

As described, the front fork 44 may comprise first and second pairs of fork-ends 46a, 46b to accommodate wheels of different sizes. Although not shown, a similar arrangement may also be used at the rear fork.

Although the holes 20a, 20b have been described as pivot holes, it will be appreciated that the connecting member 8 may be removed from the front portion 4 and reattached in a new orientation so that the connecting member 8 does not actively pivot about the hole 20a, 20b. Similarly, the connection between the connecting member 8 and the rear portion 6 need not be a pivot in the conventional sense.

In other embodiments, the bottom bracket shell 38 may be provided on the rear portion 6 instead of the connecting member 8.

Although the invention has been described with reference to a conventional bicycle, it may also be implemented in the form of an electric bicycle (e-bike). The invention is, however, limited to upright bicycles and not recumbent bicycles.

The invention is not limited to the embodiments described herein, and may be modified or adapted without departing from the scope of the present invention.

The invention claimed is:

1. A bicycle frame comprising:
   a front portion configured to receive a front wheel assembly;
   a rear portion configured to receive a rear wheel assembly; and
   a connecting member connected to the front portion at a first connecting point and connected to the rear portion at a second connecting point, the first and second connecting points being spaced from one another along the length of the connecting member;
   wherein one of the front and rear portions extends towards and is connected to the other of the front and rear portions at a third connecting point to form a link;
   wherein the front and rear portions are movable relative to one another and the link restricts the relative positions of the front and rear portions;
   wherein the relative movement of the front and rear portions includes a translational component by which the entire front portion moves relative to the entire rear portion;
   wherein the frame is configured so as to allow a distance between at least two of the connecting points to be adjusted;
   wherein adjustment of said distance increases or decreases the size of the frame;

wherein adjustment of said distance increases both a vertical and a horizontal dimension of the frame or decreases both a vertical and a horizontal dimension of the frame.

2. A bicycle frame as claimed in claim 1, wherein the frame is configured so as to allow a distance between the first and third connecting points or a distance between the second and third connecting points to be adjusted.

3. A bicycle frame as claimed in claim 1, wherein adjustment of said distance increases or decreases at least one of the reach and wheelbase of the frame.

4. A bicycle frame as claimed in claim 3, wherein adjustment of said distance increases or decreases both the reach and wheelbase simultaneously.

5. A bicycle frame as claimed in claim 1, wherein adjustment of said distance increases or decreases both the vertical and horizontal dimensions simultaneously.

6. A bicycle frame as claimed in claim 1, wherein the vertical dimension includes at least one of a stack, axle-stack, head tube height, top tube height, standover height and minimum saddle height and the horizontal dimension includes at least one of a wheelbase, reach and axle-reach.

7. A bicycle frame as claimed in claim 1, wherein the link includes a plurality of mounting positions which define said distance.

8. A bicycle frame as claimed in claim 7, wherein the plurality of mounting positions are formed by a plurality of discrete holes or a continuous slot.

9. A bicycle frame as claimed in claim 8, wherein the plurality of holes or continuous slot is provided on the front portion.

10. A bicycle frame as claimed in claim 1, wherein adjustment of said distance changes an orientation of the connecting member, wherein the orientation of the connecting member determines the relative positions of the front and rear portions.

11. A bicycle frame as claimed in claim 10, wherein adjustment of said distance changes the orientation of the connecting member relative to at least one of the front and rear portions.

12. A bicycle frame as claimed in claim 1, wherein the first connecting point is formed as a first pivot or the second connecting point is formed as a second pivot.

13. A bicycle frame as claimed in claim 12, wherein the front portion includes a tensioning slot to which the first pivot is slidably mounted or the rear portion comprises a tensioning slot to which the second pivot is slidably mounted, wherein the tensioning slot enables the orientation of the connecting member to be adjusted so as to tension a belt or chain.

14. A bicycle frame as claimed in claim 13, wherein the tensioning slot is provided with a lead screw arrangement which moves the pivot along the slot.

15. A bicycle frame as claimed in claim 1, wherein at least one of the connecting member and rear portion includes a bottom bracket shell.

16. A bicycle frame as claimed in claim 15, wherein the bottom bracket shell is disposed below the second connecting point.

17. A bicycle frame as claimed in claim 15, wherein at least one of the first connecting point, the second connecting point and the bottom bracket shell are offset from a longitudinal axis of the connecting member such that rotation of the connecting member about the longitudinal axis changes the position of at least one of the first connecting point, the second connecting point and the bottom bracket shell.

18. A bicycle frame as claimed in claim 1, wherein the connecting member is configured to receive a seat assembly.

19. A bicycle comprising a bicycle frame as claimed in claim 1.

20. A bicycle as claimed in claim 19, further including a seat assembly received by a connecting member, the seat assembly including a seat post and a saddle, the seat post and saddle having a complementary curved rail portion and clamp portion, the saddle being slidable relative to the seat post along the curved rail portion; wherein the curved rail portion is configured such that the angle of the saddle relative to the post changes as it is slid relative to the seat post.

21. A bicycle as claimed in claim 20, wherein the angle of the saddle increases as it is slid backwards.

22. A bicycle as claimed in claim 19, wherein the bicycle further includes a front fork having a plurality of fork-ends located at different positions for receiving wheels of different size.

23. A bicycle as claimed in claim 19, wherein the bicycle further includes a sprocket assembly, the sprocket assembly having an inner sprocket and an outer annular sprocket which engages with the inner sprocket, wherein the outer annular sprocket is removable from the inner sprocket to alter a gear ratio.

24. A kit of parts comprising:
a front portion configured to receive a front wheel assembly;
a rear portion configured to receive a rear wheel assembly; and
a connecting member;
wherein the front portion, the rear portion and the connecting member are configured to be assembled to form the bicycle frame of claim 1.

25. A method of adjusting the size of the bicycle frame of claim 1, the method comprising:
adjusting the distance between at least two of the connecting points so as to increase or decrease the size of the frame.

26. A bicycle comprising:
a rear sprocket connected to a driven rear wheel;
a crankset having a front sprocket and connected to the rear sprocket by a chain or toothed belt;
wherein at least one of the front or rear sprocket includes a sprocket assembly, the sprocket assembly including an inner sprocket and an outer annular sprocket detachably connectable to the inner sprocket, the sprocket assembly having a first configuration where the outer annular sprocket is detached from the inner sprocket and a second configuration where the outer annular sprocket is connected to the inner sprocket such that the inner sprocket and outer annular sprocket are concentrically nested;
wherein the inner sprocket has a plurality of teeth which engage with the chain or toothed belt when in the first configuration; and
wherein the outer annular sprocket has a radially outer surface having a plurality of teeth which engage with the chain or toothed belt when in the second configuration and a radially inner surface having a plurality of teeth which engage with the teeth of the inner sprocket when in the second configuration;
wherein the number of teeth on the radially outer surface of the outer annular sprocket is greater than the number of teeth on the inner sprocket and the sprocket assembly is convertible between the first and second configurations to alter a gear ratio of the bicycle.

27. A bicycle as claimed in claim 26, wherein the outer annular sprocket is formed by a plurality of segments which are detachably connected to one another.

28. A bicycle as claimed in claim 27, wherein the plurality of segments are detachably connected to one another by interlocking joints.

29. A bicycle as claimed in claim 27, wherein the outer annular sprocket includes two semi-circular halves.

30. A bicycle as claimed in claim 26, wherein the number of teeth on the radially inner surface of the outer annular sprocket is equal to the number of teeth on the inner sprocket.

31. A bicycle as claimed in claim 26, wherein the outer annular sprocket is a first outer annular sprocket and the sprocket assembly further includes a second outer annular sprocket, wherein the number of teeth on the second outer annular sprocket are greater than the number of teeth on the first outer annular sprocket;

wherein the second outer annular sprocket is detachably connectable to the inner sprocket or the first outer annular sprocket, the sprocket assembly having a third configuration where the second outer annular sprocket is connected to the inner sprocket or the first outer annular sprocket.

32. A bicycle frame comprising:

a front portion configured to receive a front wheel assembly;

a rear portion configured to receive a rear wheel assembly; and a connecting member connected to the front portion at a first connecting point and connected to the rear portion at a second connecting point, the first and second connecting points being spaced from one another along the length of the connecting member;

wherein one of the front and rear portions extends towards and is connected to the other of the front and rear portions at a third connecting point to form a link;

wherein the front and rear portions are movable relative to one another and the link restricts the relative positions of the front and rear portions;

wherein the relative movement of the front and rear portions includes a translational component;

wherein the frame is configured so as to allow a distance between at least two of the connecting points to be adjusted;

wherein adjustment of said distance increases or decreases the size of the frame;

wherein the connecting member is configured to receive a seat assembly; and wherein adjustment of said distance increases both a vertical and a horizontal dimension of the frame or decreases both a vertical and a horizontal dimension of the frame.

* * * * *